US009864566B2

(12) United States Patent
Yamaguchi

(10) Patent No.: US 9,864,566 B2
(45) Date of Patent: Jan. 9, 2018

(54) INFORMATION DISPLAY SYSTEM AND INFORMATION DISPLAY METHOD

(71) Applicant: Panasonic Intellectual Property Management Co., Ltd., Osaka (JP)

(72) Inventor: Koichiro Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 159 days.

(21) Appl. No.: 14/815,285

(22) Filed: Jul. 31, 2015

(65) Prior Publication Data
US 2015/0339091 A1 Nov. 26, 2015

Related U.S. Application Data

(63) Continuation of application No. PCT/JP2014/004534, filed on Sep. 3, 2014.

(30) Foreign Application Priority Data

Mar. 25, 2014 (JP) ................................. 2014-062285

(51) Int. Cl.
*G06F 3/147* (2006.01)
*G09G 5/00* (2006.01)
(Continued)

(52) U.S. Cl.
CPC ......... *G06F 3/147* (2013.01); *G01C 21/3661* (2013.01); *G09G 5/006* (2013.01);
(Continued)

(58) Field of Classification Search
CPC ....... H04W 48/08; H04W 84/12; H04W 4/00; H04W 4/23; H04W 8/26; G06F 3/147;
(Continued)

(56) References Cited

U.S. PATENT DOCUMENTS

2005/0223086 A1* 10/2005 Raverdy ............... H04W 48/08
709/220
2010/0261433 A1 10/2010 Kohno et al.
(Continued)

FOREIGN PATENT DOCUMENTS

JP 2009-210887 9/2009
JP 2010-211547 9/2010
(Continued)

OTHER PUBLICATIONS

International Search Report dated Nov. 25, 2014 in corresponding International Application No. PCT/JP2014/004534.
(Continued)

*Primary Examiner* — Christopher E Leiby
(74) *Attorney, Agent, or Firm* — Wenderoth, Lind & Ponack, L.L.P.

(57) ABSTRACT

An information display system, which displays information suitable for each browser requiring information in a specific place, includes: a display device etc. which transmit signals via electromagnetic waves; and a portable terminal. The portable terminal includes: a reception measurement unit that receives the signals from the display device etc. and measures intensity of the signal; and a portable-device transmission unit that transmits predetermined data and intensity data indicating a measurement result. The display device includes: a display-device transmission unit that repeatedly transmits the signal via electromagnetic waves; and a display unit that changes a display state according to the data transmitted from the portable terminal. The display unit changes the display state to a first state where display information is displayed according to the predetermined data, when the intensity is greater than a first threshold, and changes a value of the first threshold after the change of the display state.

1 Claim, 26 Drawing Sheets

(51) Int. Cl.
  *G01C 21/36* (2006.01)
  *H04M 1/725* (2006.01)
  *H04W 4/02* (2009.01)
(52) U.S. Cl.
  CPC ...... *H04M 1/7253* (2013.01); *G09G 2370/02* (2013.01); *H04W 4/023* (2013.01)
(58) Field of Classification Search
  CPC . G09G 5/006; G09G 2370/02; H04M 1/7253; G01C 21/3661
  See application file for complete search history.

(56) References Cited

U.S. PATENT DOCUMENTS

| | | | |
|---|---|---|---|
| 2010/0267335 A1 | 10/2010 | Kohno et al. | |
| 2011/0238846 A1* | 9/2011 | Den Hartog | H04L 67/141 709/227 |
| 2011/0294433 A1* | 12/2011 | Matsubara | H04M 1/7253 455/41.3 |
| 2012/0079567 A1* | 3/2012 | Van De Groenendaal | H04L 63/102 726/4 |
| 2012/0262276 A1* | 10/2012 | Ross | H04L 67/18 340/8.1 |
| 2013/0145288 A1* | 6/2013 | Zadeh | G06F 3/0484 715/753 |
| 2013/0249926 A1* | 9/2013 | Izumihara | G09G 5/37 345/581 |
| 2013/0258701 A1* | 10/2013 | Westerinen | G06F 1/1637 362/602 |
| 2013/0301630 A1* | 11/2013 | Suda | H04W 48/08 370/338 |
| 2014/0080416 A1* | 3/2014 | Seo | H04M 1/7253 455/41.2 |
| 2014/0225931 A1* | 8/2014 | Plagemann | G06T 3/40 345/660 |
| 2014/0273986 A1* | 9/2014 | Luna | H04L 67/16 455/414.1 |
| 2014/0337607 A1* | 11/2014 | Peterson | G06F 9/4401 713/1 |
| 2014/0368411 A1* | 12/2014 | Tsukamoto | G06F 13/00 345/2.3 |
| 2016/0135100 A1* | 5/2016 | Teyeb | H04W 36/0055 370/331 |
| 2016/0142874 A1* | 5/2016 | Jung | H04W 8/005 455/456.1 |
| 2016/0337795 A1* | 11/2016 | Nachman | H04W 4/023 |
| 2016/0345254 A1* | 11/2016 | Iwami | H04W 76/02 |

FOREIGN PATENT DOCUMENTS

| | | |
|---|---|---|
| JP | 2013-80123 | 5/2013 |
| JP | 5286112 | 9/2013 |
| JP | 5307306 | 10/2013 |
| WO | 2012/098802 | 7/2012 |
| WO | 2013/065817 | 5/2013 |
| WO | 2013/109322 | 7/2013 |

OTHER PUBLICATIONS

Extended European Search Report dated May 10, 2017 in corresponding European Application No. 14879272.4.

* cited by examiner

FIG. 7

| Signage table | | | 520 |
|---|---|---|---|
| Beacon ID | | 1032 | |
| Displayable classification (1) | Ticket classification | Swimming | |
| | Display order | 1 | |
| Displayable classification (2) | Ticket classification | Tennis | |
| | Display order | 1 | |
| ⋮ | | ⋮ | |

521 — Beacon ID
522 — Displayable classification (1)
522a — Ticket classification
522b — Display order

FIG. 8

| Ticket classification | Display order | Language | Content item ID |
|---|---|---|---|
| Swimming | 1 | English | C011 |
| Swimming | 1 | Portuguese | C012 |
| Swimming | 1 | Japanese | C013 |
| ⋮ | ⋮ | ⋮ | ⋮ |
| Swimming | 2 | English | C021 |
| ⋮ | ⋮ | ⋮ | ⋮ |
| Tennis | 1 | English | C311 |
| ⋮ | ⋮ | ⋮ | ⋮ |

530 Content item table, 531, 532, 533, 534

FIG. 9

| User table | | |
|---|---|---|
| 541 | User ID | JA01234 |
| 542 | Ticket classification | Swimming |
| 543 | Browsing history | 1032 |

540

INFORMATION DISPLAY SYSTEM AND INFORMATION DISPLAY METHOD

CROSS REFERENCE TO RELATED APPLICATION

This is a continuation application of PCT International Application No. PCT/JP2014/004534 filed on Sep. 3, 2014, designating the United States of America, which is based on and claims priority of Japanese Patent Application No. 2014-062285 filed on Mar. 25, 2014. The entire disclosures of the above-identified applications, including the specifications, drawings and claims are incorporated herein by reference in their entirety.

FIELD

The present disclosure relates to information display systems for displaying information and information display methods used in the information display systems.

BACKGROUND

Patent Literature (PTL) 1 discloses a technique of distributing information according to a state of a user group in an area including signage.

CITATION LIST

Patent Literature

[PTL 1] Japanese patent publication No. 5286112

SUMMARY

Technical Problem

It is an object of the present disclosure to provide an information display system that displays information suitable for each individual browser requiring information in a specific place, and an information display method used in the information display system.

Solution to Problem

The information display system according to the present disclosure includes: one or more display devices each of which transmits a signal via electromagnetic waves; and a portable terminal, wherein the portable terminal includes: a reception measurement unit configured to receive the signal transmitted from each of the one or more display devices, and measure an intensity of the signal; and a portable-terminal transmission unit configured to transmit predetermined data and intensity data that indicates a result of the measurement of the reception measurement unit, each of the one or more display devices includes: a display-device transmission unit configured to repeatedly transmit the signal via electromagnetic waves; and a display unit configured to change a display state of the display device according to the predetermined data and the intensity data which are transmitted from the portable terminal, and the display unit is configured to: change the display state to a first state where display information is displayed according to the predetermined data, when the intensity indicated by the intensity data is greater than a first threshold; and change a value of the first threshold after the change of the display state to the first state.

Furthermore, in the information display method according to the present disclosure, the change of the first threshold is decreasing the value of the first threshold.

Advantageous Effects

The information display system and the information display method according to the present disclosure are capable of providing useful information to each individual browser requiring information in a specific place.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a diagram illustrating a structure and a data example of a signage table stored in a server device, FIG. 8 is a diagram illustrating a structure and a data example of a content item table stored in the server device.

FIG. 9 is a diagram illustrating a structure and a data example of a user table stored in the server device.

DESCRIPTION OF EMBODIMENT

Figure 1:
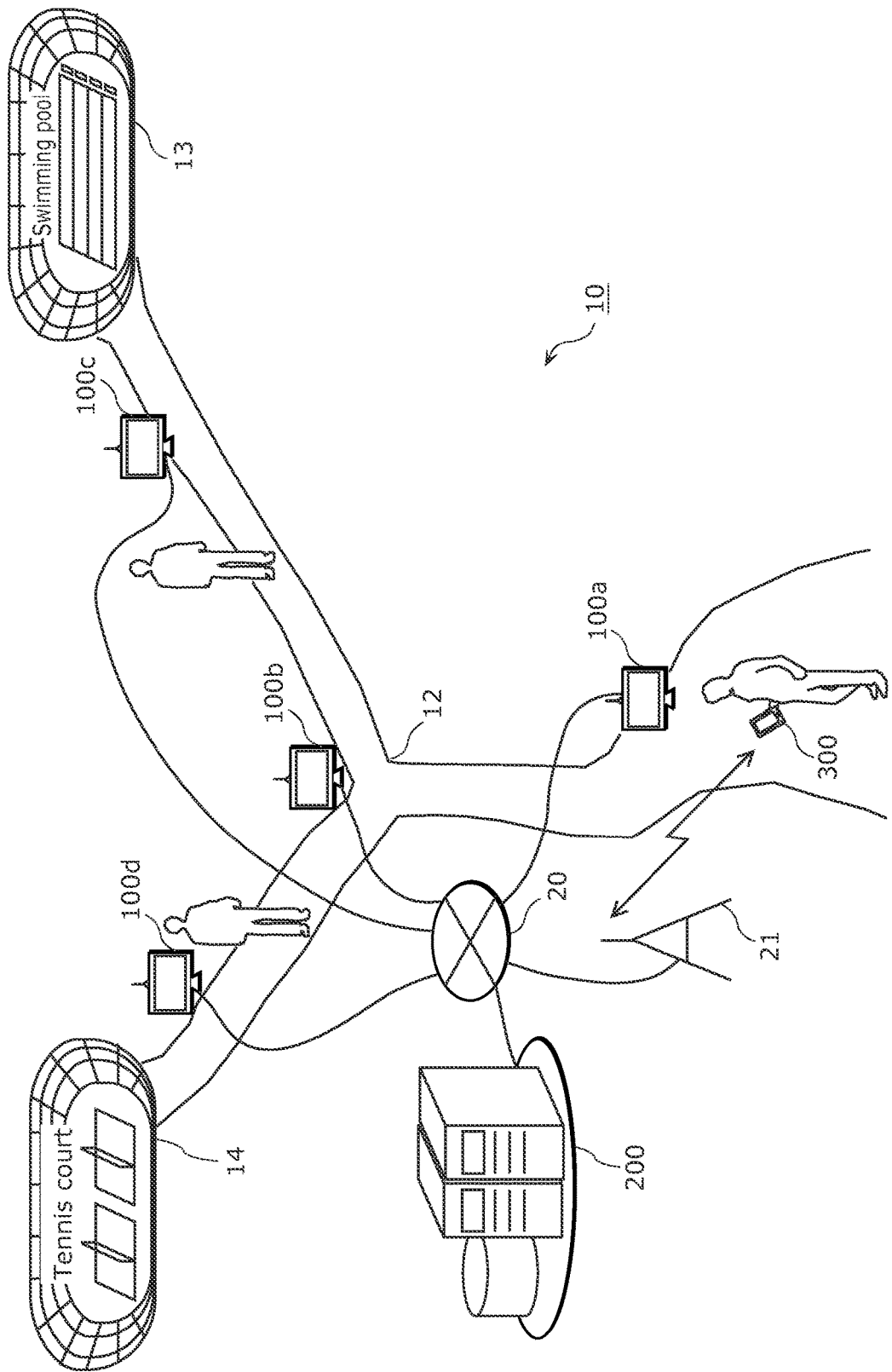
FIG. 1 is a schematic diagram illustrating a configuration example of an information display system according to Embodiment.

In order to display information suitable for each individual browser (user carrying a portable terminal) requiring information in a specific place, in accordance with an aspect of the present disclosure, there is provided an information display system according to the present disclosure includes: one or more display devices each of which transmits a signal via electromagnetic waves; and a portable terminal, wherein the portable terminal includes: a reception measurement unit configured to receive the signal transmitted from each of the one or more display devices, and measure an intensity of the signal; and a portable-terminal transmission unit configured to transmit predetermined data and intensity data that indicates a result of the measurement of the reception measurement unit, each of the one or more display devices includes: a display-device transmission unit configured to repeatedly transmit the signal via electromagnetic waves; and a display unit configured to change a display state of the display device according to the predetermined data and the intensity data which are transmitted from the portable terminal, and the display unit is configured to: change the display state to a first state where display information is displayed according to the predetermined data, when the intensity indicated by the intensity data is greater than a first threshold; and change a value of the first threshold after the change of the display state to the first state. Here, the predetermined data somehow relates to the portable terminal and the user of the portable terminal. For example, the predetermined data may be data inputted by the user into the portable terminal.

In the information display system having the above configuration, the display state of the display device changes according to a relative distance between the display device and a browser who is a user of the portable terminal. Furthermore, the user can browse useful display information associated with the predetermine data which relates to the portable terminal, when the user approaches the display device to be at a distance from the display device so that an intensity of a signal received from the display device is greater than the first threshold. Here, in order to detect the distance from the display device, the portable terminal measures an intensity of a signal transmitted as electromagnetic waves from the display device. Therefore, this detection method can be used not only outside buildings but also inside buildings, which is different from methods for determining a position using a global positioning system (GPS) or the like. Furthermore, after the portable terminal has got close to the display device to be at a distance from the display device enough to estimate that the user has browsed information on the display device, the display device (or another display device) displays information when the portable terminal merely gets near the display device at a distance a little longer than the previous distance from the display device.

It is, for example, also possible that the change of the first threshold is decreasing the value of the first threshold.

With the above configuration, after the portable terminal has got close to a display device to be at a distance from the display device enough to estimate that the user of the portable terminal has browsed information on the display device, the display device displays information next time when the portable terminal merely gets near the display device at a distance a little longer than the previous distance from the display device.

It is further possible that the display unit is configured to change the display state to a second state different from the first state, when the intensity indicated by the intensity data is smaller than a second threshold that is smaller than or equal to the first threshold.

With the above configuration, when the user moves away and is at a distance from the display device so that an intensity of a signal received from the display device is smaller than the second threshold, a display state of the display device is changed from the display state at the time when the user has approached the display device so that the intensity of the signal received from the display device is greater than the first threshold.

It is still further possible that the display unit is configured to keep the display state, when the intensity indicated by the intensity data is smaller than the first threshold and greater than the second threshold.

The above configuration prevents frequent switching of display information, so that the user can easily watch the display information.

It is still further possible that the information display system further includes a server device including: a server-device receiving unit configured to receive the predetermined data and the intensity data which are transmitted from the portable terminal; a display information determination unit configured to determine the display information according to the predetermined data and the intensity data which are received by the server-device receiving unit; and a server-device transmission unit configured to transmit, to a target one of the one or more display devices, display data indicating the display information determined by the display information determination unit, wherein each of the one or more display devices further includes a display-device receiving unit configured to receive the display data transmitted from the server device, and the display unit is configured to display the display information indicated by the display data received by the display-device receiving unit.

With the above configuration, the server device not the display device receives the data from the portable terminal to determine display information. Therefore, the configuration is suitable, for example, when the information display system includes a plurality of display devices.

It is still further possible that the display information determination unit is configured to (i) determine the display information according to the predetermined data when the intensity indicated by the intensity data is greater than the first threshold, and (ii) determine the display information regardless of the predetermined data when the intensity is smaller than a second threshold that is smaller than or equal to the first threshold, and when the display information determination unit determines the display information according to the predetermined data and the server-device receiving unit newly receives the predetermined data and the intensity data by the server-device receiving unit after the determination, the server device decreases the value of the first threshold.

With the above configuration, if the user has once got close to a display device and browsed information on the display device, the display device can display, for the user, information suitable for the user when the user merely gets near the display device to be at a distance a little longer than the previous distance from the display device.

It is still further possible that the predetermined data includes one of portable-terminal identification data identifying the portable terminal and user identification data identifying a user of the portable terminal, the server device further includes a storage unit configured to hold association data and displayable classification data, the association data associating data in the predetermined data with classification data that indicates one of a plurality of classifications, and the displayable classification data indicating at least one of the classifications of the display information regarding which each of the one or more display devices is capable of displaying, and the display information determination unit is configured to, when the predetermined data is received from the portable terminal, specify the classification data associated with the data in the predetermined data with reference to the storage unit, compare the one of the classifications which is indicated by the classification data with the at least one of the classifications indicated by the displayable classification data, and determine the display information according to a result of the comparison.

With the above configuration, for example, the predetermined data (the user identification data) is associated with the classification data indicating classification for which the user requires information. Therefore, the user can browse information regarding the classification which the user requires, when the user approaches a display device capable of displaying the information regarding the classification which the user requires. Furthermore, for example, when the user approaches a display device that is not capable of displaying the information regarding the classification which the user requires, the display device can display, for example, information for notifying the user of that the display device is not capable of displaying information regarding the classification.

It is still further possible that the one or more display devices comprise two or more display devices, the signal transmitted by the display-device transmission unit in each of the two or more display devices includes display-device identification data identifying the display device, the predetermined data includes the display-device identification data, and the server-device transmission unit is configured to transmit the display information determined by the display information determination unit according to the predetermined data received by the server-device receiving unit, to the display device identified by the display-device identification data included in the predetermined data.

With the above configuration, the user carrying the portable terminal can obtain useful information from a display device which the user approaches among a plurality of display devices, It is still further possible that the display information determination unit is configured to (i) determine the display information according to the predetermined data when the intensity indicated by the intensity data is greater than the first threshold, and (ii) determine the display information regardless of the predetermined data when the intensity is smaller than a second threshold that is smaller than or equal to the first threshold, and when the display information determination unit determines the display information according to the predetermined data and the server-device receiving unit newly receives the predetermined data and the intensity data by the server-device receiving unit after the determination, if the display device identified by the display-device identification data included in the predetermined data newly received is in a specific area, the server device decreases the value of the first threshold.

With the above configuration, after the portable terminal has got close to a display device to be at a distance from the display device enough to estimate that the user of the portable terminal has browsed information on the display device, a display device in the specific area displays information for the user when the portable terminal merely gets near the display device at a distance from the display device which is a little longer than the previous distance from the previous display device.

It is still further possible that the server device further includes a storage unit configured to hold association data indicating association between the data in the predetermined data and classification data that indicates one of a plurality of classifications, and the server device determines the specific area according to the one of the classifications which is indicated by the classification data associated with the predetermined data received by the server-device receiving unit.

With the above configuration, for example, it is possible to determine an appropriate specific area according to information regarding the classification which the user requires.

It is still further possible that the transmission of the signal by the display-device transmission unit is performed by emitting radio waves, and the measurement by the reception measurement unit is measurement of an electric field intensity.

With the above configuration, the portable terminal approaching a display device can receive radio waves from the display device, even if a user of the portable terminal does not expose the portable terminal to the outside. Therefore, the use can obtain useful information from the display device even if the user carries the portable terminal inside a bag, a pocket of clothes, or the like.

In accordance with another aspect of the present disclosure, An information display method used in an information display system including a portable terminal and one or more display devices each of which transmits a signal via electromagnetic waves, the information display method comprising: repeatedly transmitting the signal from each of the one or more display devices via electromagnetic waves; receiving by the portable terminal the signal transmitted from a target display device among the one or more display devices, and measuring by the portable terminal an intensity of the signal; transmitting predetermined data and intensity data that indicates a result of the measuring; and changing a display state of the target display device according to the predetermined data and the intensity data which are transmitted in the transmitting, wherein the changing includes: changing the display state to a first state where display information is displayed according to the predetermined data, when the intensity indicated by the intensity data is greater than a first threshold; and changing a value of the first threshold after the changing of the display state to the first state.

By this, the display state of the display device changes according to a relative distance from the display device and a browser who is a user of the portable terminal. Furthermore, the user can browse useful display information associated with the predetermined data that relates to the portable terminal, when the user approaches the display device to be at a distance from the display device so that an intensity of a signal received from the display device is greater than the first threshold. Moreover, after the portable terminal has got close to a display device to be at a distance from the display device enough to estimate that the user of the portable terminal has browsed information on the display device, the display device displays information next time when the portable terminal merely gets near the display device at a distance a little longer than the previous distance, These general and specific aspects may be implemented to a device, a system, a method, an integrated circuit, a computer program, a computer-readable recording medium, or the like and may be implemented also to a desired combination of at least two of them.

Hereinafter, certain exemplary embodiments are described in greater detail with reference to the accompanying Drawings. However, excessively detailed explanation is sometimes omitted, For example, detailed explanation of well-known matters or overlapping explanation of the substantially identical structures is sometimes omitted in order to prevent the following description from being unnecessarily redundant and to make the person skilled in the art to easily understand the description.

It should be noted that the inventors provide the Drawings and the following description to make the person skilled in the art to sufficiently understand the present disclosure, and do not intend to limit the present disclosure to the Drawings and the description. More specifically, numerical values, shapes, materials, constituent elements, arrangement positions and the connection configuration of the constituent elements, steps in a method, the order of the steps, and the like described in the following embodiments are merely examples, and are not intended to limit the present disclosure. Therefore, among the constituent elements in the following embodiments, constituent elements that are not described in independent claims are described as elements constituting more desirable configurations. It should also be noted that these figures in the Drawings are schematic diagram and are not necessarily exact illustrations.

(Embodiment 1)

In Embodiment 1, the description is given for an information display system 10 that performs an information display method for displaying information suitable for each individual browser (user carrying a portable terminal) requiring information in a specific place.

The following describes Embodiment 1 with reference to FIGS. 1 to 20.

[1-1. Configuration]

FIG. 1 is a schematic diagram illustrating a configuration example of the information display system 10 according to Embodiment 1.

Referring to FIG. 1, the information display system 10 includes display devices 100a to 100d, a server device 200, and a portable terminal 300. The information display system 10 may include a plurality of portable terminals. In this example, however, one portable terminal 300 is focused among them. In the information display system 10 illustrated in FIG. 1, the display devices 100a to 100d are set in various places in a sport event site including venues such as a swimming pool 13 and a tennis court 14. Each of the display devices 100a to 100d displays information or the like for guiding a user (visitor) carrying the portable terminal 300 to a venue where the user is to watch a sports game. The user can browse information displayed on such a display device, when, for example, the user moves towards a venue (the swimming pool 13, the tennis court 14, or the like) to watch the sports game. The user may hold the portable terminal 300 with his/her hand or carry the portable terminal 300 in a bag, a pocket of clothes, or the like.

Each of the display devices (signage) 100a to 100d, which are referred to also as digital signage, electronic advertisement boards, or the like, is a device that displays information on a display screen or the like. The display device includes a beacon transmitter, a communication interface such as a communication circuit, a memory, a processor, a display, and the like. Here, the beacon transmitter includes a wireless transmission circuit that transmits beacon signals through radio waves from an antenna according to Bluetooth (trademark), Bluetooth low energy (BLE), or the like which belongs to a so-called near field radio communication standard.

The server device 200 is a computer that includes a memory, a storage medium such as a hard disk device, a communication interface such as a communication circuit, a processor, and the like. The server device 200 is capable of communicating with the display devices 100a to 100d and the portable terminal 300 via the Internet 20 by using the communication interface. Here, the Internet 20, which may be a local area network (LAN), a wide area network (WAN), or the like, is a communication network for mutual connection by wires or by radio waves.

Figure 2:
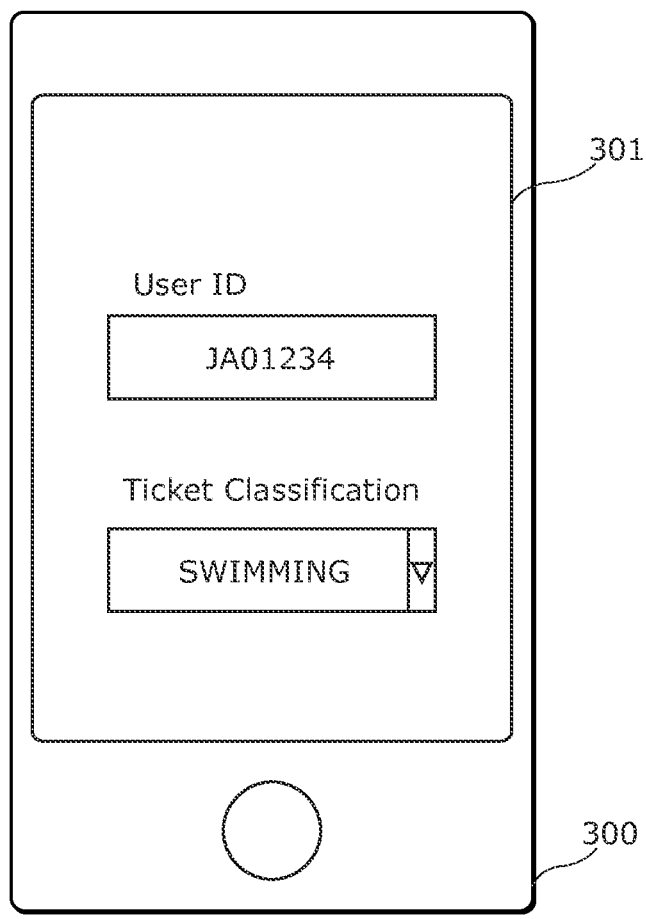
FIG. 2 is a diagram illustrating a graphical user interface (GUI) screen of a portable terminal

The portable terminal 300 is a terminal device, such as a smartphone or a tablet, which is carried by the user. The portable terminal 300 includes, for example, a memory, a processor, an input interface, a display, a communication interface that is connected by radio waves to the Internet 20 via a base station 21 or the like. The portable terminal 300 includes a receiver that receives signals transmitted through radio waves from beacon transmitters of the display devices 100a to 100d, and a detection circuit that detects electric field intensity of each of the received signals. The memory is a read only memory (ROM), a random access memory (RAM), or the like. The memory holds a control program for controlling each of the units in the portable terminal 300 and setting values and the like to be used in the control program. The memory is also used to temporarily hold various values to be used when the processor executes the control program. The input interface is a keyboard, a pointing device, or the like. For example, the input interface may be a touch panel overlapping the display screen. A graphical user interface (GUI) screen 301 as illustrated in FIG. 2 is displayed on the display of the portable terminal 300. FIG. 2 illustrates the situation where the user visiting a sports event site inputs, to the portable terminal 300, a user ID and ticket classification indicating a sports game the user is to watch. If the user owns a plurality of tickets for watching various sports games, the user may designate (input) ticket classification with a highest priority according to the sports game for which the user currently wishes to get information. The user has purchased such a ticket for watching sports games from, for example, online ticket services or the like by using the portable terminal 300 and currently owns the ticket.

An example of using the information display system 10 is described with reference to FIG. 3. A beacon signal transmitted from the beacon transmitter included in the display device 100a is attenuated as a distance from the beacon transmitter increases. Therefore, as the user carrying the portable terminal 300 is approaching the display device 100a (beacon transmitter), intensity of the beacon signal (electric field intensity) detected by the detection circuit of the portable terminal 300 increases. This leads the following, for example. If the portable terminal 300 is positioned inside a circle shown by a boundary 101, intensity of a beacon signal detected by the portable terminal 300 is greater (higher) than a predetermined first threshold. If the portable terminal 300 is positioned outside a circle shown as a boundary 102, intensity of the beacon signal detected by the portable terminal 300 is smaller (lower) than a predetermined second threshold that is smaller than the first threshold. Therefore, by comparing the intensity of the beacon signal detected by the portable terminal 300 to a threshold corresponding to each boundary, it is possible to determine whether the portable terminal 300 and the user carrying the portable terminal 300 are, for example, close to the display device 100a, far from the display device 100a, or near the display device 100a, in other words, at a position between the close position and the far position.

Figure 4:
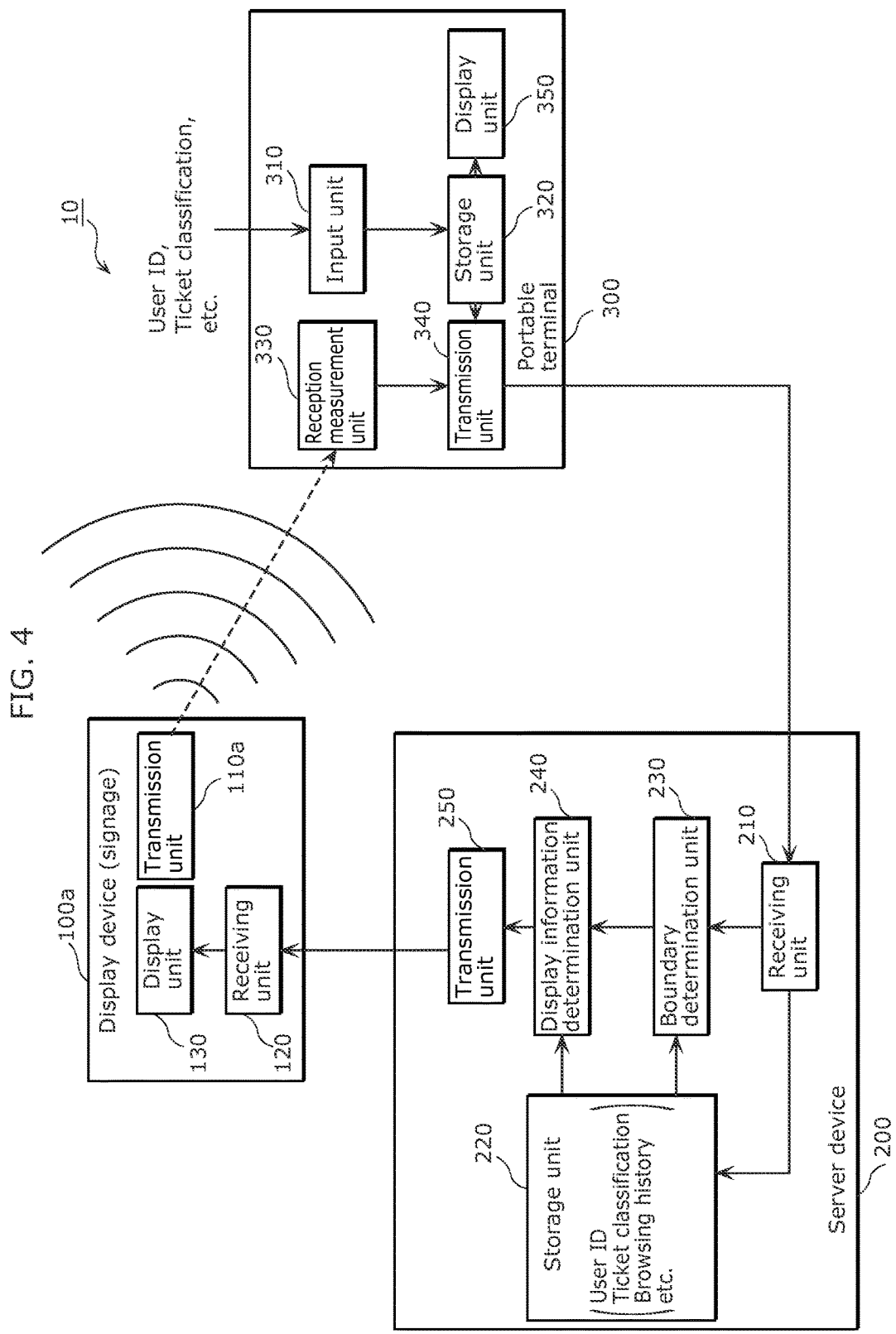
FIG. 4 is a functional block diagram of the information display system.

The following describes in detail each of the display devices, the portable terminal, and the server device included in the above-described information display system 10, FIG. 4 is a functional block diagram of the information display system 10.

[1-1-1. Functional Structure of Display Device]

Referring to FIG. 4, the display device 100a functionally includes a transmission unit 110a, a receiving unit 120, and a display unit 130. These functional units are described below.

The transmission unit 110a includes the above-described beacon transmitter. The transmission unit 110a has a function of repeatedly transmitting, at a predetermined cycle, a beacon signal including a beacon ID that has been determined as display-device identification data for identifying the display device 100a among the group of display devices (display devices 100a to 100d).

The receiving unit 120 includes a communication interface and the like. The receiving unit 120 has a function of communicating with the server device 200 via the Internet 20 and thereby receives display data (described later) from the server device 200.

The display unit 130 has a function of holding, in a storage medium such as a memory, display information based on the display data received by the receiving unit 120, and performs displaying on the display based on the display information. This function is achieved, for example, by the processor executing the control program stored in the memory.

Each of the display devices 100b to 100d has the same structure as that of the display device 100a. However, a beacon ID transmitted by the transmission unit of each of the display devices is predetermined as display-device identification data for identifying the individual display device.

[1-1-2. Functional Structure of Server Device]

Referring to FIG. 4, the server device 200 functionally includes a receiving unit 210, a storage unit 220, a boundary determination unit 230, display information determination unit 240, and a transmission unit 250. These functional units will be described below.

The receiving unit 210 includes a communication interface and the like. The receiving unit 210 has a function of communicating with the portable terminal 300 via the Internet 20, then receiving signage data (described later) transmitted form the portable terminal 300, and storing the signage data into the storage unit 220.

The storage unit 220 is a part of areas in the storage medium such as a memory. The storage unit 220 holds content items to be used as display information on the display device, data regarding the display device (signage table), data regarding display information (content item table), data regarding the user of the portable terminal (user table), and the like. The signage table, the content item table, and the user table will be described in more detail later.

The boundary determination unit 230 has a function of determining a distance boundary used to control display information on the display device, according to a distance between the portable terminal 300 and each of the display devices 100a to 100d (intensity of a beacon signal transmitted from the beacon transmitter of the display device measured by the portable terminal 300).

The display information determination unit 240 has a function of determining display information for each of the display devices 100a to 100d with reference to the tables stored in the storage unit 220. The functions of the boundary determination unit 230 and the display information determination unit 240 are achieved, for example, by the processor executing the control program stored in the memory.

The transmission unit 250 includes a communication interface and the like. The transmission unit 250 has a function of communicating with each of the display devices 100a to 100d via the Internet 20 and transmitting display data indicating display information determined by the display information determination unit 240 for each of the display devices 100a to 100d. It should be noted that the transmission unit 250 holds data for determining a position on a network regarding a transmission destination, such as an Internet Protocol address (IP address) of each of the display devices,

[1-1-3. Functional Structure of Portable Terminal]

Referring to FIG. 4, the portable terminal 300 functionally includes an input unit 310, a storage unit 320, a reception measurement unit 330, a transmission unit 340, and a display unit 350. These functional units will be described below.

The input unit 310 includes a processor that executes a control program, an input interface, and the like. The input unit 310 has a function of receiving user's inputs, such as inputs of a user ID and ticket classification indicating a sports game, and storing the inputs into the storage unit 320.

The storage unit 320 is a part of areas in the memory. The storage unit 320 has a function of holding the user ID, the ticket classification, and the like which are provided via the input unit 310.

The reception measurement unit 330 includes a receiver receiving a beacon signal transmitted from the beacon transmitter of each of the display devices, a diction circuit or the like that detects an electric field intensity of the received beacon signal, and the like. The reception measurement unit 330 has a function of providing the transmission unit 340 with a beacon ID 501 (see FIG. 5) included in the beacon signal and data indicating the electric field intensity (intensity data).

The transmission unit 340 includes a processor that executes the control program, and a communication interface, and the like.

The transmission unit 340 has a function of being connected to the Internet 20 via the base station 21 or the like and transmitting signage data including the beacon signal and the intensity data to the server device 200. It should be noted that the transmission unit 340 is set to hold data of the server device 200, such as an IP address, for specifying a position of the server device 200 as a destination on the network.

The display unit 350 includes a display and the like. The display unit 350 has a function of performing displaying on a GUI screen under the control of the portable terminal 300 which is achieved by the processor executing the control program stored in the memory.

[1-2. Data]

The following describes pieces of data handled by the information display system 10 having the above-described configuration.

Figure 5:
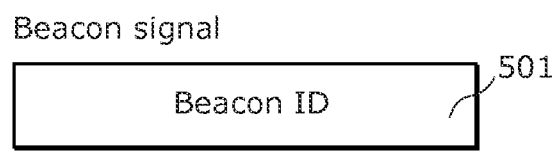
FIG. 5 is a diagram illustrating a structure of a beacon signal transmitted by the display device.

FIG. 5 is a diagram illustrating a structure of a beacon signal which the transmission unit (transmission unit 110a or the like) in each of the display devices periodically transmits according to a standard, such as Bluetooth or BLE. As illustrated in FIG. 5, the beacon signal is a signal modulated to indicate a beacon ID 501. A beacon ID 501 is used as display-device identification information identifying a display device having a transmission unit (beacon transmitter) that has transmitted a beacon signal with the beacon ID 501. Therefore, beacon IDs 501 are different according to respective transmission units (respective display devices). This beacon ID is received by the portable terminal 300 and then included in signage data which the portable terminal 300 transmits to the server device 200. It should be noted that the beacon ID 501 may have a value unique to a corresponding beacon signal transmitted by a beacon transmitter at a specific frequency, or a value unique to a corresponding one of the beacon transmitters. It is also possible that the beacon ID has the same value as a value of a display device ID which is predetermined for each display device.

Figure 6:
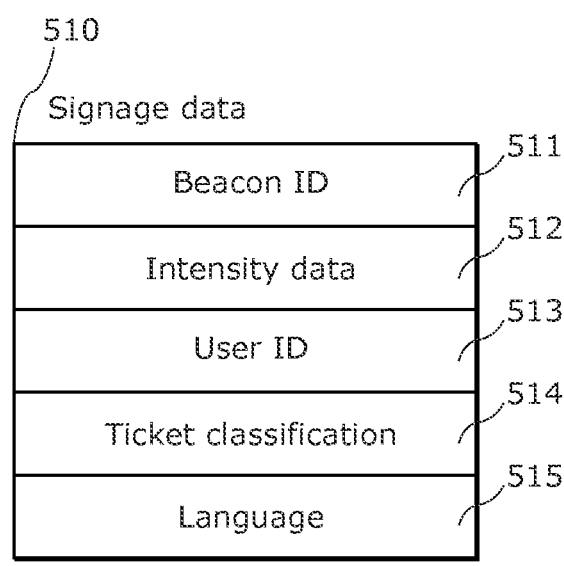
FIG. 6 is a diagram illustrating a structure of signage data transmitted by the portable terminal.

FIG. 6 is a diagram illustrating a structure of signage data 510 transmitted by the portable terminal 300. The signage data 510 is generated when the portable terminal 300 approaches one of the display devices (signage) and thereby receives a beacon signal including a beacon ID from the display device. The generated signage data 510 is then transmitted to the server device 200. As illustrated in FIG. 6, the signage data 510 includes a beacon ID 511, intensity data 512, and predetermined pieces of data (a user ID 513, ticket classification 514, a language 515, and the like) to be used to determine display information on the display device. These pieces of predetermined data are somehow related to the portable terminal 300 or the user of the portable terminal 300.

The beacon ID 511 indicates a beacon ID 501 that is display-device identification data transmitted from the transmission unit of one of the display devices and received by the reception measurement unit 330 of the portable terminal 300. The intensity data 512 is data indicating an electric field intensity of the beacon signal which is detected by the reception measurement unit 330 of the portable terminal 300. The user ID 513 is identification data indentifying the user of the portable terminal 300. The user ID 513 is designated (inputted) by the user and received by the input unit 310 of the portable terminal 300. The ticket classification 514 is designated (inputted) by the user and received by the input unit 310 of the portable terminal 300. This ticket classification is an example of classification data indicating one of various classifications of sports games to be watched by the user, such as swimming, tennis, and judo. The language 515 is data indicating a language to be used in displaying on the portable terminal 300. The language used in displaying is set as an initial value of the portable terminal 300 or as a setting value designated by the user. For example, characters displayed on the GUI screen of the display unit 350 are in this language.

FIG. 7 is a diagram illustrating a structure and a data example of a signage table 520 stored in the storage unit 220 of the server device 200. The signage table 520 indicates, for each of the display devices, pieces of data which can be displayed on the display device, The signage table 520 is a set of records in each of which a beacon ID 521 as display-device identification data is associated with displayable classification data 522. The pieces of data in the signage table 520 are set beforehand by a manager, an operator, or the like of the information display system 10 according to a setting position of the corresponding display device or the like. Ticket classification 522a in the displayable classification data 522 indicates a classification for which the display device can display information among various sports game classifications. A display order 522b in the displayable classification data 522 indicates a position of a corresponding piece of information regarding the ticket classification 522a displayable on the display device in a display order. The example of FIG. 7 illustrates that the first information regarding swimming, the first information regarding tennis, and the like can be displayed on a display device corresponding to a beacon ID of 1032.

FIG. 8 is a diagram illustrating a structure and a detailed example of a content item table 530 stored in the storage unit 220 of the server device 200. The content item table 530 includes, for each of the display devices 100a to 100d, a content item ID 534 that indicates a content item available as display information on the display device, ticket classification 531 as an attribute of the display information, a display order 532, and a language 533 in association with one another. This association is performed by a manager, an operator, or the like of the information display system 10 when the content item available as display information is generated for the corresponding display device.

Like the ticket classification 514 in the signage data 510, the ticket classification 531 indicates a classification of the various sports game classifications. The ticket classification 531 is data indicating a classification of sports game for which the content item identified by the content item ID 534 provides data. The display order 532 is data indicating a position of the content item identified by the content item ID 534 in a display order of displaying a plurality of content items regarding the ticket classification 531. The language 533 is data indicating a language of characters described in the content item indicated by the content item ID 534. The content item ID 534 is identification data identifying the content item. FIG. 8 shows an example of data in the content item table 530 in which a content item identified by a content item ID of "C011", for example, is the first information regarding swimming (for example, the first information for guiding a route to a swimming pool) which is described in English.

FIG. 9 is a diagram illustrating a structure and a data example of a user table 540 held in the storage unit 220 of the server device 200. The user table 540 is a set of records in each of which a user ID 541, ticket classification 542, and a browsing history 543 are associated with one another.

The user ID 541 is identification data indentifying the user carrying the portable terminal 300. The ticket classification 542 is a classification of a sports game which the user is to watch. The browsing history 543 is data indicating that the user carrying the portable terminal 300 has approached one of the display devices and browsed display information on the display device. For example, the browsing history 543 is a beacon ID transmitted from the transmission unit of the display device displaying the display information browsed by the user. The user ID 541, the ticket classification 542, and the beacon ID are extracted by the server device 200 from the signage data transmitted from the portable terminal 300.

[1-3. Operations]

The following describes operations performed by the information display system 10 having the above-described configuration and handling the above-described pieces of data.

[1-3-1. Operations of Portable Terminal]

Figure 10:
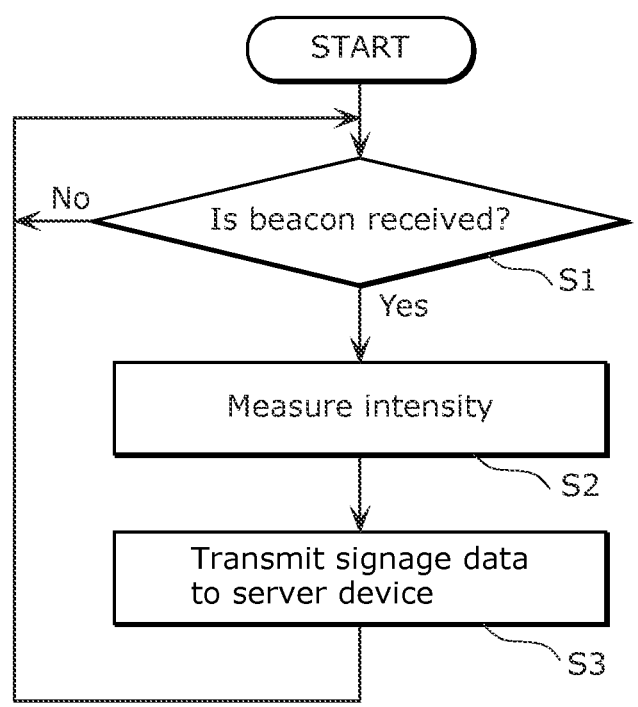
FIG. 10 is a flowchart of processing performed by the portable terminal regarding receiving of a beacon signal.

When the input unit 310 of the portable terminal 300 receives inputs of a user ID, ticket classification, and the like from the user, the portable terminal 300 performs input processing for storing the received inputs into the storage unit 320, and also performs processing for waiting and receiving a beacon signal as illustrated in FIG. 10. It should be noted that the above processing is performed by execution of a specific application program by a processor in the portable terminal 300 when receiving a user's operation or the like.

FIG. 10 is a flowchart of processing performed by the portable terminal 300 regarding receiving of a beacon signal. The following describes operations performed by the portable terminal 300 with reference to FIG. 10.

The reception measurement unit 330 of the portable terminal 300 waits until a beacon signal is received (Step S1). When a beacon signal is received, the reception measurement unit 330 extracts a beacon ID from the received beacon signal and measures an electric field intensity of the received beacon signal by a detection circuit (Step S2). Here, at Step S1, it is also possible to operate a receiver only when there is a possibility of receiving a beacon signal to determine whether or not a beacon signal is receivable. A result of measuring an electric field intensity is expressed as intensity data that indicates a measured value for specifying the electric field intensity as, for example, one of three levels of high, medium, and low. For example, the intensity data indicates High when the portable terminal 300 approaches a beacon transmitter (display device) and within a distance of approximately 2 m from the beacon transmitter, indicates Medium when the portable terminal 300 is at a distance ranging from approximately 3 m to approximately 10 m from the beacon transmitter, and indicates Low when the portable terminal 300 is at a distance ranging from approximately 10 m to approximately 15 m from the beacon transmitter.

After the beacon ID is obtained and its electric field intensity is measured, the transmission unit of the portable terminal 300 generates signage data (see FIG. 6) and transmits the generated signage data to the server device 200 (Step S3). This signage data includes the obtained beacon ID, intensity data indicating the measured electric field intensity, and predetermined pieces of data (a user ID and ticket classification which have been stored into the storage unit 320 in the input processing, and data indicating a language that is predetermined as an initial value, a setting value, or the like).

Since a transmission unit (beacon transmitter) of each of the display devices 100a to 100d transmits a beacon signal, the portable terminal 300 approaching one of the display devices in the sports event site transmits signage data to the server device 200.

[1-3-2. Operations of Server Device and Display Operations of Display Device]

The server device 200 performs control (transmission of display data) for changing a display state of a corresponding display device according to signage data (including intensity data, predetermined pieces of data, and the like) transmitted from the portable terminal 300. Therefore, the display unit 130 of the display device changes a display state according to the display data provided from the server device 200, in other words, according to the intensity data, the predetermined pieces of data, and the like.

Figure 11:
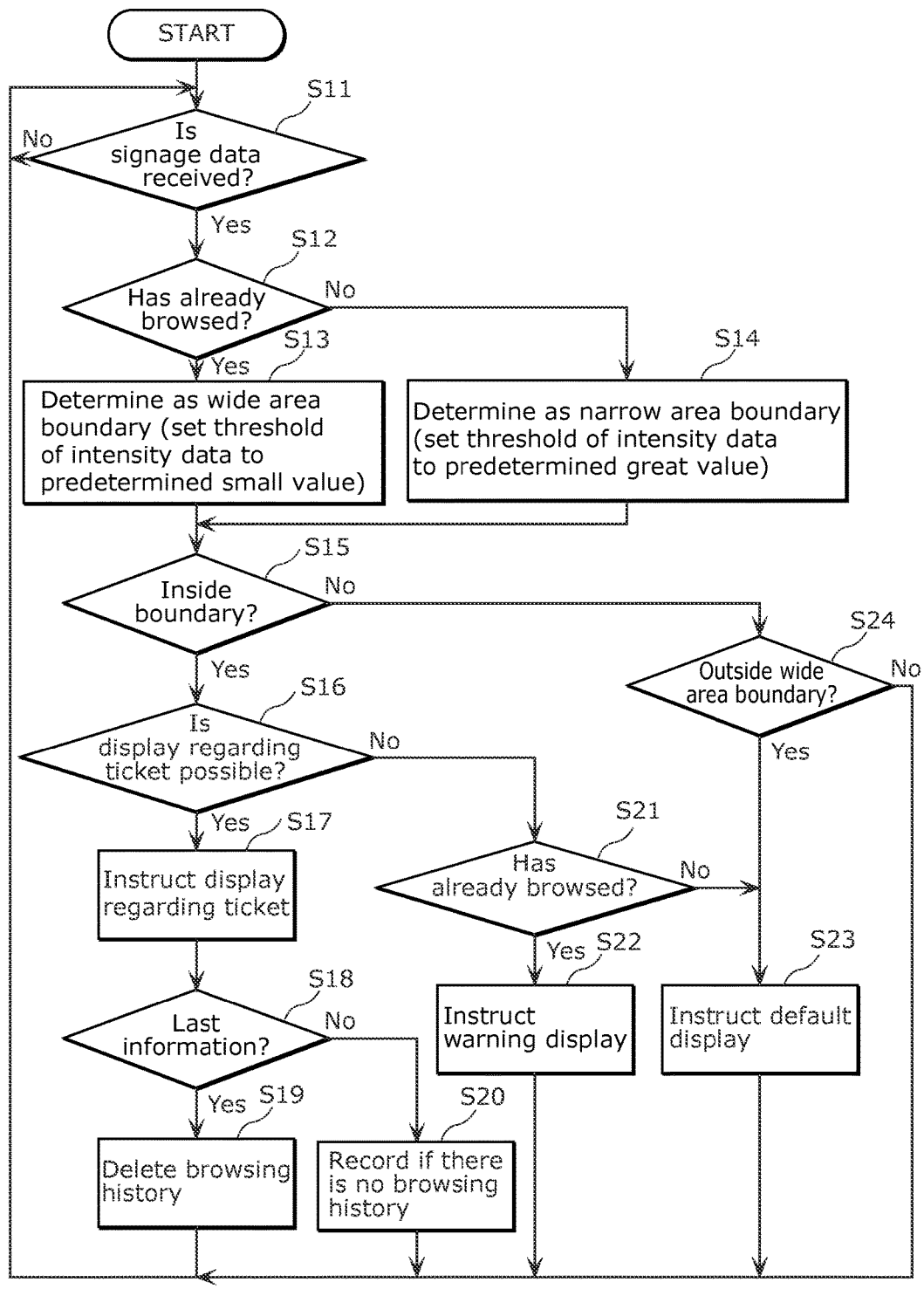
FIG. 11 is a flowchart of processing performed by the server device.

FIG. 11 is a flowchart of operations performed by the server device 200. The following describes operations performed by the server device 200 with reference to FIG. 11. In the following description, it is assumed that the portable terminal 300 is carried by the user in the sports event site (see FIG. 1), that the user owns a ticket for watching swimming as illustrated in FIG. 2, and that the user approaches each of the display devices in the site to obtain information of a route to a swimming pool as needed.

The server device 200 waits signage data transmitted from the portable terminal 300. When the server device 200 receives signage data via the receiving unit 210 (Step S11), then the boundary determination unit 230 determines whether or not the user has already browsed any display information regarding the ticket classification on any of the display devices (Step S12). This determination is made by examining whether or not the user table (see FIG. 9) held in the storage unit 220 includes a beacon ID that is display-device identification data identifying any of the display devices and is used as a browsing history associated with a user ID included in the received signage data. This is because when the portable terminal 300 carried by the user approaches one of the display devices and enters a certain area measured from the display device and thereby transmits signage data to the server device 200, the user ID and the beacon ID (browsing history) are associated with each other in the user table (at Step S20 described later). It should be noted that when, for example, the portable terminal 300 approaches a display device to be within the certain area, the user carrying the portable terminal 300 can browse information on the display device. Therefore, in the determination at Step S12, it is considered the existence of the portable terminal 300 within the certain area as user's browsing of information on the display device.

If it is determined at Step S12 that the user has already browsed some display information regarding the ticket classification on any of the display devices, the boundary determination unit 230 determines a wide area boundary as a boundary between inside and outside of a certain area (Step S13). The boundary is to be used by the server device 200 to change display information of a display device when the portable terminal 300 is within the certain area measured from the display device. On the other hand, if it is determined that the user has not yet browsed any display information regarding the ticket classification on any of the display devices, then the boundary determination unit 230 determines a narrow area boundary narrower than the wide area boundary as a boundary between inside and outside of the certain area (Step S14). This means that, if the user has approached a display device and changed a display state of the display device, a value of a threshold of intensity data, which is to be used in determination as to whether the user carrying the portable terminal 300 is inside the boundary, is changed. In other words, at Step S14, the threshold of the intensity data is set to be a predetermined great value, for example, a value between a value indicating High and a value indicating Medium as the intensity data, and at Step S13, the threshold of the intensity data is set to be a predetermined small value smaller than the predetermined great value, for example, a value between a value indicating Medium and a value indicating Low as the intensity data, Therefore, the threshold of the intensity data is the predetermined great value before the user browses information displayed on any of the display devices, and then after the user browses the information, the threshold is changed to the predetermined small value.

Therefore, the display information determination unit 240 of the server device 200 determines whether or not the portable terminal 300 enters the inside of a boundary determined as the wide area boundary or the narrow area boundary (Step S15). For example, if it is determined that the portable terminal 300 enters the inside of the wide area boundary and the intensity data in the signage data indicates Medium or higher, then it is determined that the portable terminal 300 is inside the wide area boundary. On the other hand, if it is determined that the portable terminal 300 is inside the narrow area boundary and the intensity data indicates High, then it is determined that the portable terminal 300 enters the inside of the narrow area boundary. In other words, when the measured value of the electric field intensity indicated by the intensity data exceeds the above-described threshold of the intensity data, it is determined that the portable terminal 300 enters the inside of the boundary.

If it is determined at Step S15 that the portable terminal 300 enters the inside of the boundary, the display information determination unit 240 determines whether or not the display device inside the boundary is capable of display information regarding a thicket that the user of the portable terminal 300 owns (Step S16). This determination is made by determining whether or not there is the same pair as a pair of a beacon ID and ticket classification included in the signage data received from the portable terminal 300 among pairs of beacon IDs and ticket classifications included in the signage table (see FIG. 7) of the storage unit 220.

If it is determined at Step S16 that the display device is capable of displaying display information regarding the ticket classification of the portable terminal 300, then the display information determination unit 240 transmits display data indicating display information regarding the ticket classification to the display device (Step S17). More specifically, the display information determination unit 240 specifies display information with reference to the content item table (see FIG. 8) based on (a) displayable classification data (ticket classification, display order) in the record in the signage table corresponding to the ticket classification in the signage data and (b) the language included in the signage data. In other words, the display information determination unit 240 specifies a content item identified by a content item ID in the content item table as the display information, and transmits display data including the content item to the display device. It should be noted that the display data may include the content item ID instead of the content item. In this case, the display device may designate the content item ID included in the received display data, then download the content item from the server device or another storage medium or the like, and display the downloaded content item. The transmission destination of the display data at Step S17 is the display device identified by the beacon ID (display-device identification data) in the signage data received by the server device 200. As a result of transmitting display data at Step S17, the display device which the portable terminal 300 carried by the user approaches displays the specified display information and the user can browse the display information.

Subsequently, the server device 200 determines whether or not the display information designated in the display data is the last information in the display order regarding the classification (Step S18). If it is determined that the display information is the last information, then the browsing history in the user table is deleted (Step S19). On the other hand, if it is determined that the display information is not the last information and there is no browsing history in the user table, then the beacon ID in the signage data is recorded in the browsing history (Step S20). If there is no browsing history, the user can browse information regarding the ticket classification owned by the user when the user gets close to the display device, for example, to be at a distance of approximately 2 m from the display device. Then, according to the record of the browsing history at Step S20, the user, who has once browsed information regarding the ticket classification on a display device, can browse next information regarding the ticket classification on a next display device, by getting near the next display device to be at a distance from the next display device which is longer than the distance from the previous display device in the previous browsing (for example, at a distance ranging from 3 m to 10 m from the next display device) without getting close to the next display device, At Step S16, if it is determined that the display device is not capable of displaying the display information regarding the ticket classification according to the portable terminal 300, then the display information determination unit 240 determines whether or not the user has already browsed any information regarding the ticket classification on one of the display devices (Step S21). The determination at Step S21 is the same as the determination at Step S12. It is determined at Step S21 that the user has already browsed some information regarding the ticket classification, then the display information determination unit 240 transmits, to the display device, display data that designates as display information a warning content item predetermined to be displayed when the display device is not capable of displaying information regarding the ticket classification (Step S22). Therefore, a display device which the portable terminal 300 carried by the user approaches displays the warning content item (for example, warning information or the like which warns that the user is away from a route to a venue related to the ticket owned by the user). On the other hand, if it is determined at Step S21 that the user has not yet browsed any information regarding the ticket classification, then the display information determination unit 240 transmits, to the display device, the display data that designates a predetermined default content item as display information (Step S23). Therefore, the display device which the portable terminal 300 owned by the user approaches displays the default content item (for example, general information to be displayed on the display device). It should be noted that the default content items may be different for respective display devices, or may be the same regardless the display devices. It is also possible that the display data designating a default content item as display information does not include a default content item, and the display device holds the default content item and displays the default content item according to the display information.

If it is determined at Step S15 that the portable terminal 300 does not enter the inside of the boundary and the portable terminal 300 moves to the outside of the wide area boundary (Step S24), then the display information determination unit 240 transmits display data designating a default content item as display information to the display device (Step S23). Thereby, when the portable terminal 300 moves away from the display device, the display device displays, for example, not the information regarding the ticket classification but general information or the like. It should be noted that the determination at Step S15 and the determination at Step S24 may be made based on the intensity data included in the signage data. For example, the determinations are made based on how pieces of the intensity data included in the sequentially received pieces of signage data vary. In other words, it is possible to determine that the determination at Step S15 is yes if an intensity corresponding to the outside of the boundary is changed to an intensity corresponding to the inside of the boundary, and to determine that the determination at Step S23 is yes if an intensity corresponding to the inside of the wide area boundary is changed to an intensity corresponding to the outside of the wide area boundary. It is also possible to determine that the portable terminal 300 moves to the outside of the wide area boundary if the server device 200 cannot receive next signage data after waiting for a predetermined time period (for example, in multiples of a transmission frequency of a beacon signal)after receiving the signage data.

If the display information determination unit 240 determines at Step S24 that the portable terminal 300 does not moves to the outside of the wide area boundary, then the server device 200 does not transmit display data and waits next signage data (Step S11). The display device keeps the current display state without changing the display information while the display device does not receive the display data.

It should be noted that if it is determined at Step S12 that the user has not yet browsed any information regarding the ticket classification, the determination of the display information at Step S17 performed by the display information determination unit 240 when the intensity indicated by the intensity data is high corresponding to the inside of the narrow area boundary is made based on predetermined pieces of data included in the signage data. Then, in this case, the determination of the display information at Step S23 performed by the display information determination unit 240 when the intensity indicated by the intensity data is low corresponding to the outside of the wide area boundary is made regardless of the predetermined pieces of data included in the signage data. Then, after the determination of the display information at Step S17, it is recorded at Step S20 that the user has already browsed some information regarding the ticket. Therefore, if the portable terminal 300 approaches another display device and thereby intensity data and signage data including predetermined pieces of data are received, then it is determined at Step S12 that the user has already browsed some information regarding the ticket classification. Then, if the intensity indicated by the intensity data is a week level corresponding to the inside of the wide area boundary, the display information determination unit 240 determines at Step S15 that the portable terminal 300 enters the inside of the boundary and performs processing for determining display information.

[1-3-3. Cooperation of Devices for Data Exchange]

Figure 12:
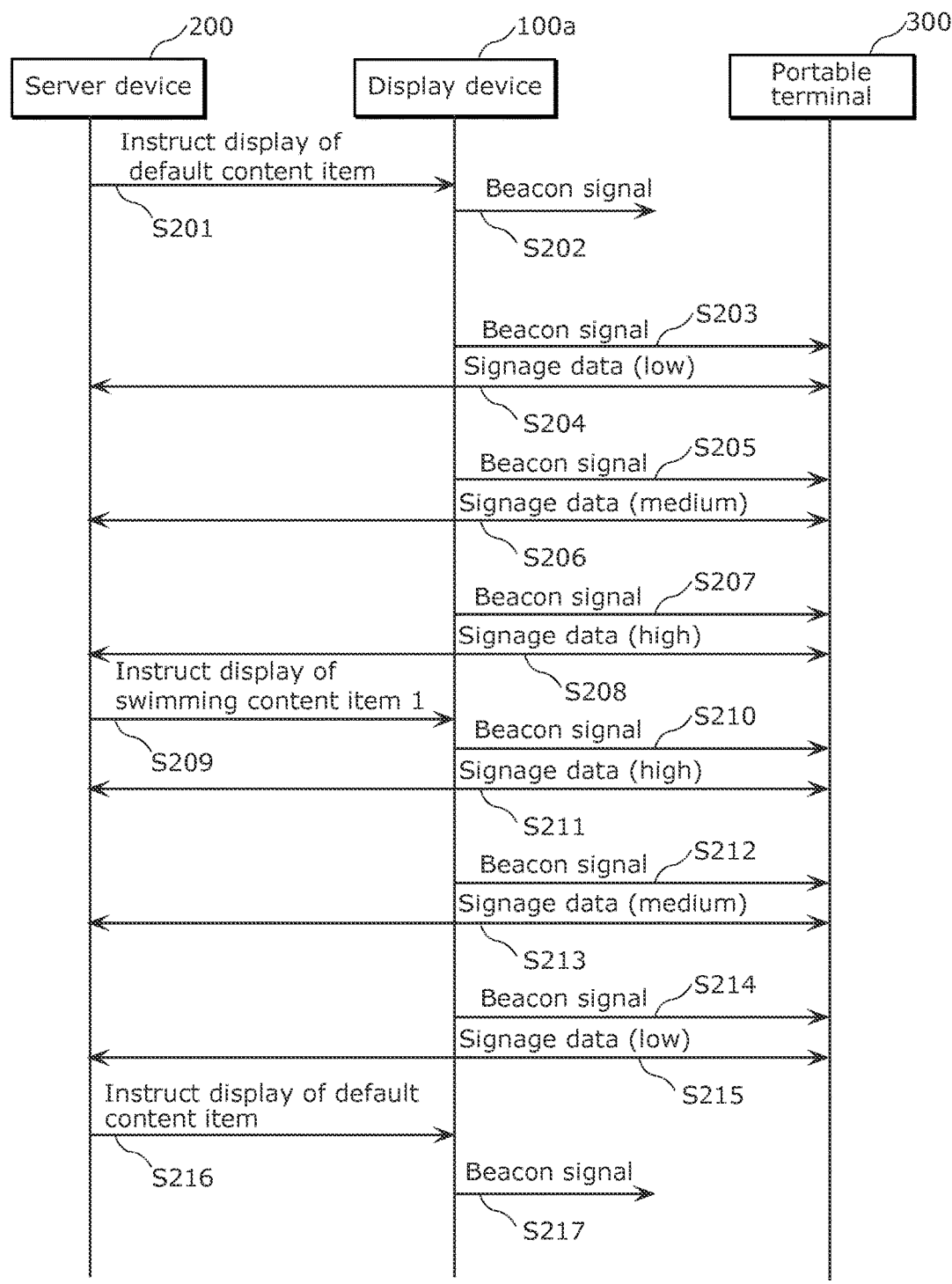
FIG. 12 is a diagram illustrating an example of a data exchange sequence between the server device, a display device, and the portable terminal in the information display system.
Figure 13:
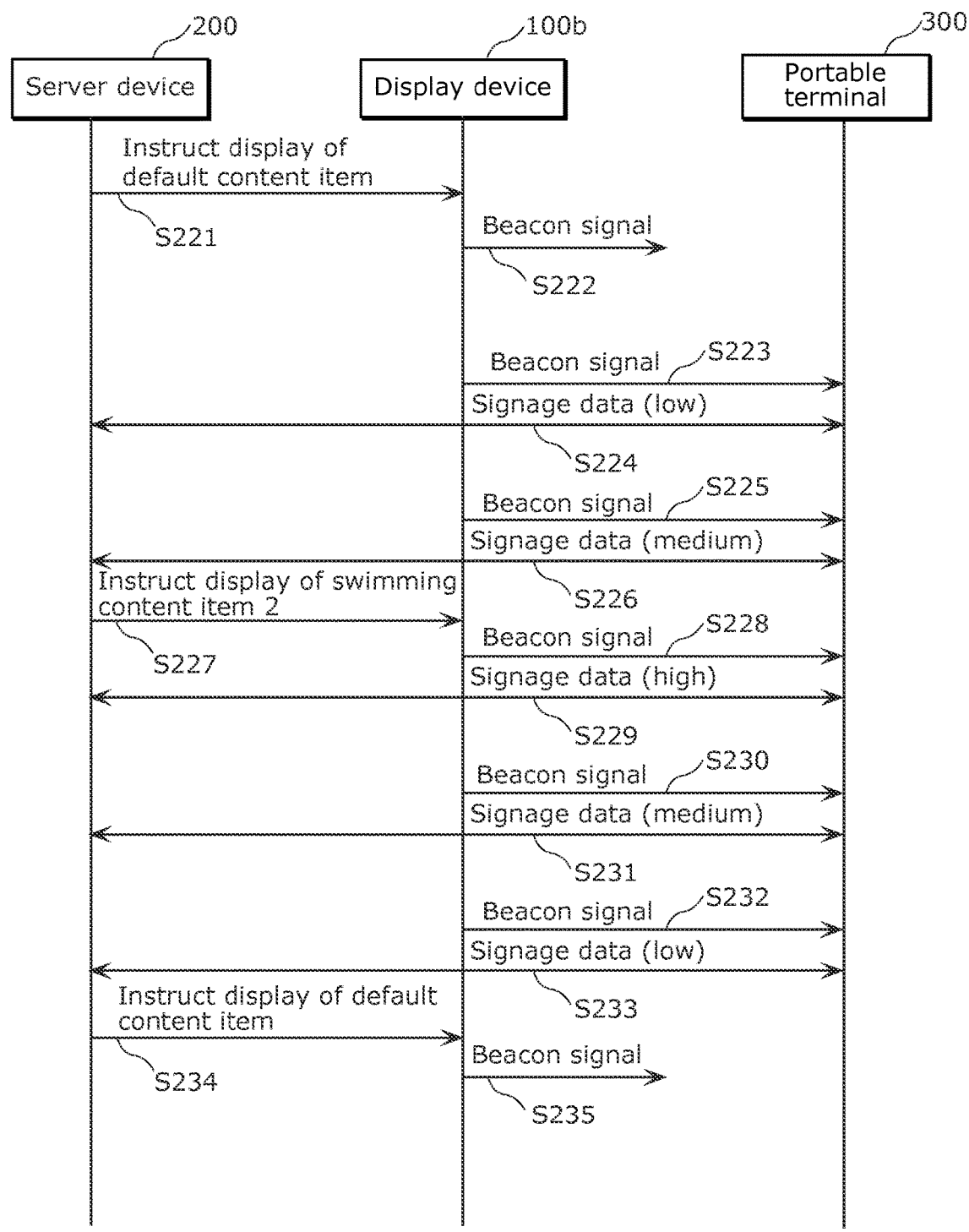
FIG. 13 is a diagram illustrating an example of a data exchange sequence between the server device, a display device, and the portable terminal in the information display system.

FIG. 12 is a diagram illustrating an example of a data exchange sequence between the display device 100*a*, the server device 200, and the portable terminal 300 which are included in the information display system 10. FIG. 13 is a diagram illustrating an example of a data exchange sequence between the display device 100*b*, the server device 200, and the portable terminal 300 which are included in the information display system 10. The following describes data exchange between these devices with reference to FIGS. 12 and 13.

Referring first to FIG. 12, a sequence related to the display device 100*a* is described.

Figure 14:
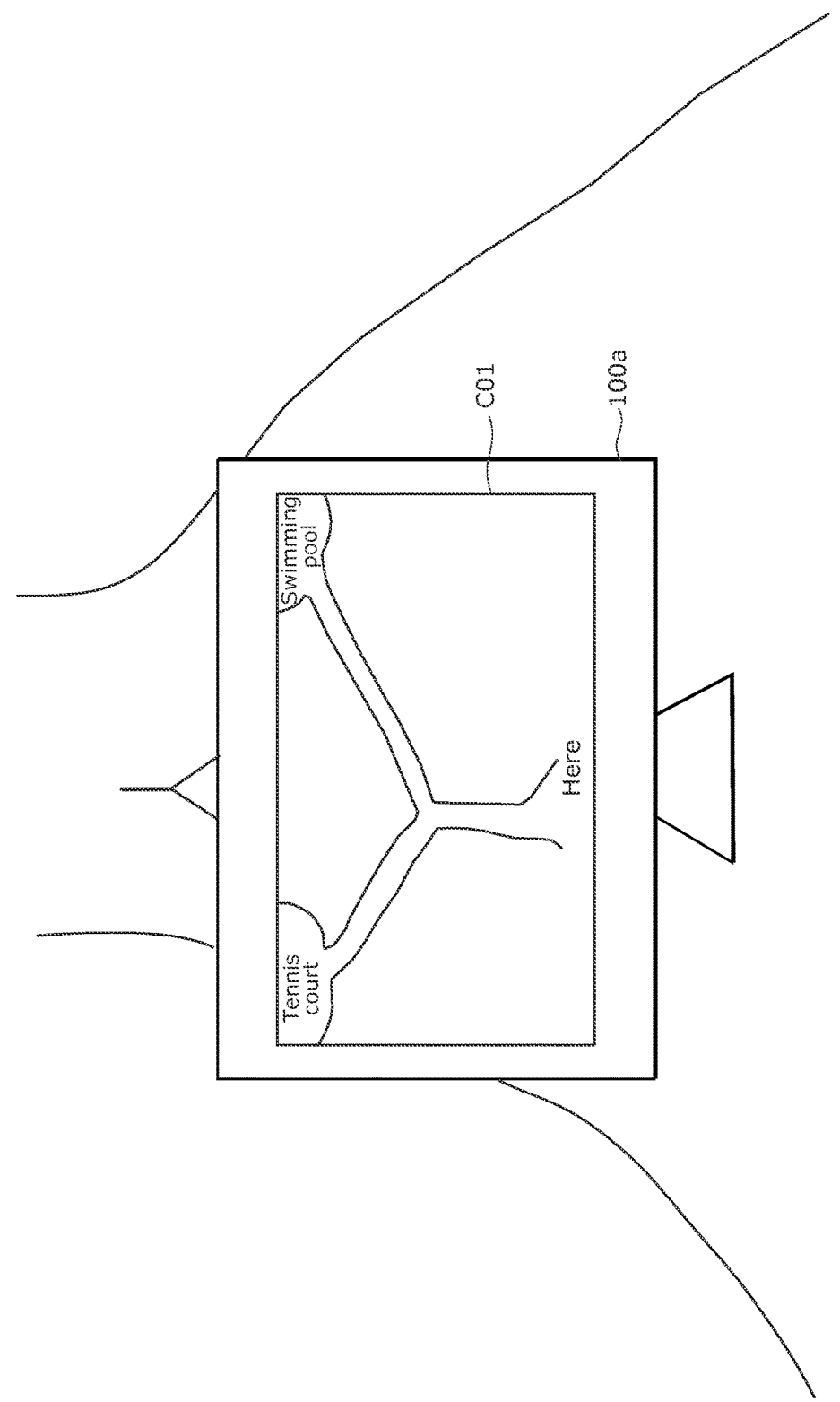
FIG. 14 is a diagram illustrating an example of displaying on the display device.

The server device 200 transmits a default-content-item display instruction (display data designating a default content item as display information) to the display device 100*a* for initial setting (Step S201). When the display device 100*a* is activated, the display device 100*a* periodically transmits beacon signals at regular time intervals. The display device 100*a*, which is set in a specific place in the sports event site (see FIG. 1), displays, for example, a screen C01 including a default content item as illustrated in FIG. 14.

In a sequence from Step S202 to Step S217 in FIG. 12, the portable terminal 300 is considerably far from the display device 100*a*, then approaches the display device 100*a* as the user carrying the portable terminal 300 moves, and then moves away from the display device 100*a*. It is assumed that swimming as ticket classification is designated in the portable terminal 300 (see FIG. 2).

It is also assumed that the user of the portable terminal 300 has not yet browsed any information regarding swimming until Step S202 (the user has not yet got close to a display device corresponding to swimming as the ticket classification). It should be noted that in each of FIGS. 12 and 13, for the sake of easy understanding of the explanation, all beacon signals are not described, or the user's moving speed is faster than an actual speed. It should also be noted that the display devices 100*a* and 100*b* are capable of displaying pieces of display information regarding swimming as the ticket classification, and the display information on the display device 100*a* and the display information on the display device 100*b* are sequentially displayed in this order (namely, display order), At Step S202, the display device 100*a* transmits a beacon signal. However, since the portable terminal 300 is far from the position of the display device 100*a*, the portable terminal 300 cannot receive the beacon signal.

At Step S203, when the display device 100*a* transmits a beacon signal, the portable terminal 300, which approaches the display device 100*a* and is currently at a distance of, for example, approximately 13 m from the display device 100*a*, receives the beacon signal and transmits signage data including intensity data indicating Low to the server device 200 (Step S204).

Figure 15:
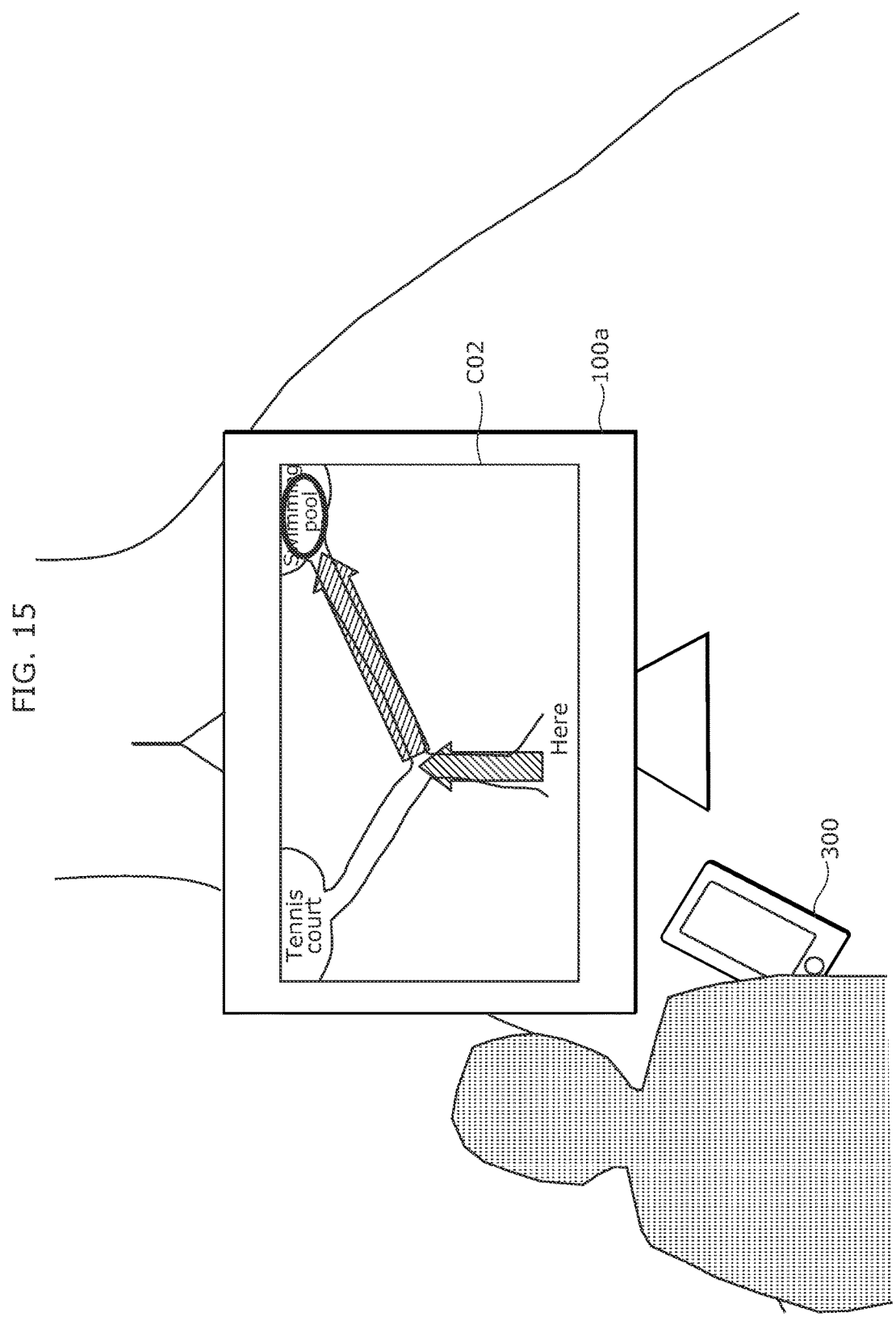
FIG. 15 is a diagram illustrating an example of displaying changed according to the portable terminal.

At Step S205, when the display device 100*a* transmits a beacon signal, the portable terminal 300, which further approaches the display device 100*a* and is currently at a distance of, for example, approximately 5 m from the display device 100*a*, receives the beacon signal and transmits signage data including intensity data indicating Medium to the server device 200 (Step S205). When receiving the signage data, the server device 200 determines that the user of the portable terminal 300 has not yet browsed any information regarding swimming as the ticket classification and the portable terminal 300 does not enter the inside of the narrow area boundary, and therefore does not transmit display data (Step S24 in FIG. 11), At Step S207, when the display device 100*a* transmits a beacon signal, the portable terminal 300, which still further approaches the display device 100*a* and is currently at a distance of, for example, approximately 1 m from the display device 100*a*, receives the beacon signal and transmits signage data including intensity data indicating High to the server device 200 (Step S208), When receiving the signage data, the server device 200 determines that the portable terminal 300 enters the inside of the narrow area boundary, and therefore transmits display data designating a swimming content item 1 as display information to the display device 100*a* corresponding to swimming as ticket classification (Step S17 in FIG. 11, Step S209 in FIG. 12). Here, the swimming content item 1 is the first content item in a display order of displaying content items regarding swimming. Here, the display device 100*a* displays, for example, a screen C02 including the swimming content item 1 (guidance information of a route to the swimming pool) as illustrated in FIG. 15. As a result, the user of the portable terminal 300 can check, for example, the route to the swimming pool as a venue for swimming which the user intends to watch.

At Step S210, when the display device 100a transmits a beacon signal, the portable terminal 300, which is still at the distance of, for example, approximately 1 m from the display device 100a, receives the beacon signal and transmits signage data including intensity data indicating High to the server device 200 (Step S211). The user who has already browsed the swimming content item 1 starts moving away from the display device 100a towards the swimming pool, for example, At Step S212, when the display device 100a transmits a beacon signal, the portable terminal 300, which moves away from the display device 100a and is currently at a distance of, for example, approximately 5 m from the display device 100a, receives the beacon signal and transmits signage data including intensity data indicating Medium to the server device 200 (Step S213).

At Step S214, when the display device 100a transmits a beacon signal, the portable terminal 300, which moves further away from the display device 100a and is currently at a distance of, for example, approximately 13 m from the display device 100a, receives the beacon signal and transmits signage data including intensity data indicating Low to the server device 200 (Step S215). When receiving the signage data, the server device 200 determines that the user of the portable terminal 300 moves to the outside of the wide area boundary, and therefore transmits display data designating a default content item as display information to the display device 100a (Step S23 in FIG. 11, Step S216 in FIG. 12). As a result, the display device 100a displays the screen C01 as illustrated in FIG. 14 again.

At Step S217, when the display device 100a transmits a beacon signal, the portable terminal 300 is already far from the display device 100a and is currently at a distance of, for example, 16 m or more from the display device 100a, and therefore cannot receive the beacon signal and does not transmit signage data. Referring now to FIG. 13, a sequence related to the display device 100b is described.

Figure 16:
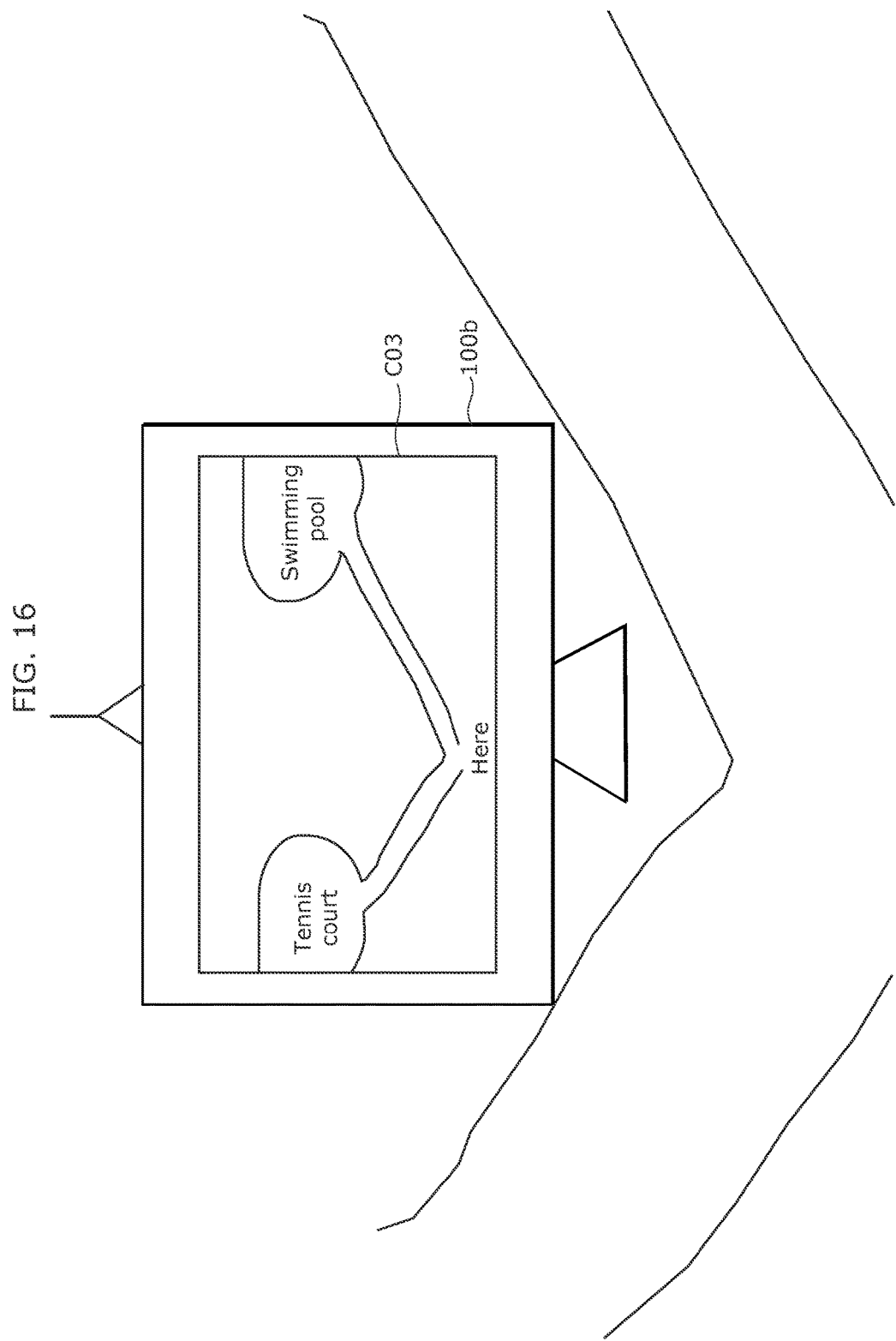
FIG. 16 is a diagram illustrating an example of displaying of the display device.

First, the server device 200 transmits a default-content-item display instruction (display data designating a default content item as display information) to the display device 100b for initial setting (Step S221). The display device 100b, which is set between the display device 100a and the swimming pool on the route to the swimming pool in the sports event site (see FIG. 1), displays a screen C03 including a default content item as illustrated in FIG. 16, for example. The display device 100b periodically transmits beacon signals at regular time intervals.

In a sequence from Step S222 to Step S237 in FIG. 13, the portable terminal 300 is considerably far from the display device 100b, then approaches the display device 100b as the user carrying the portable terminal 300 moves, and then moves away from the display device 100b. It is assumed that, by Step S222, the user of the portable terminal 300 has already browsed the screen C02 including the swimming content item 1 displayed on the display device 100a at Step S209 in FIG. 12.

At Step S222, the display device 100b transmits a beacon signal. However, since the portable terminal 300 is far from the position of the display device 100b, the portable terminal 300 cannot receive the beacon signal.

At Step S223, when the display device 100b transmits a beacon signal, the portable terminal 300, which approaches the display device 100b and is at a distance of, for example, approximately 13 m from the display device 100b, receives the beacon signal and transmits signage data including intensity data indicating Low to the server device 200 (Step S224).

Figure 17:
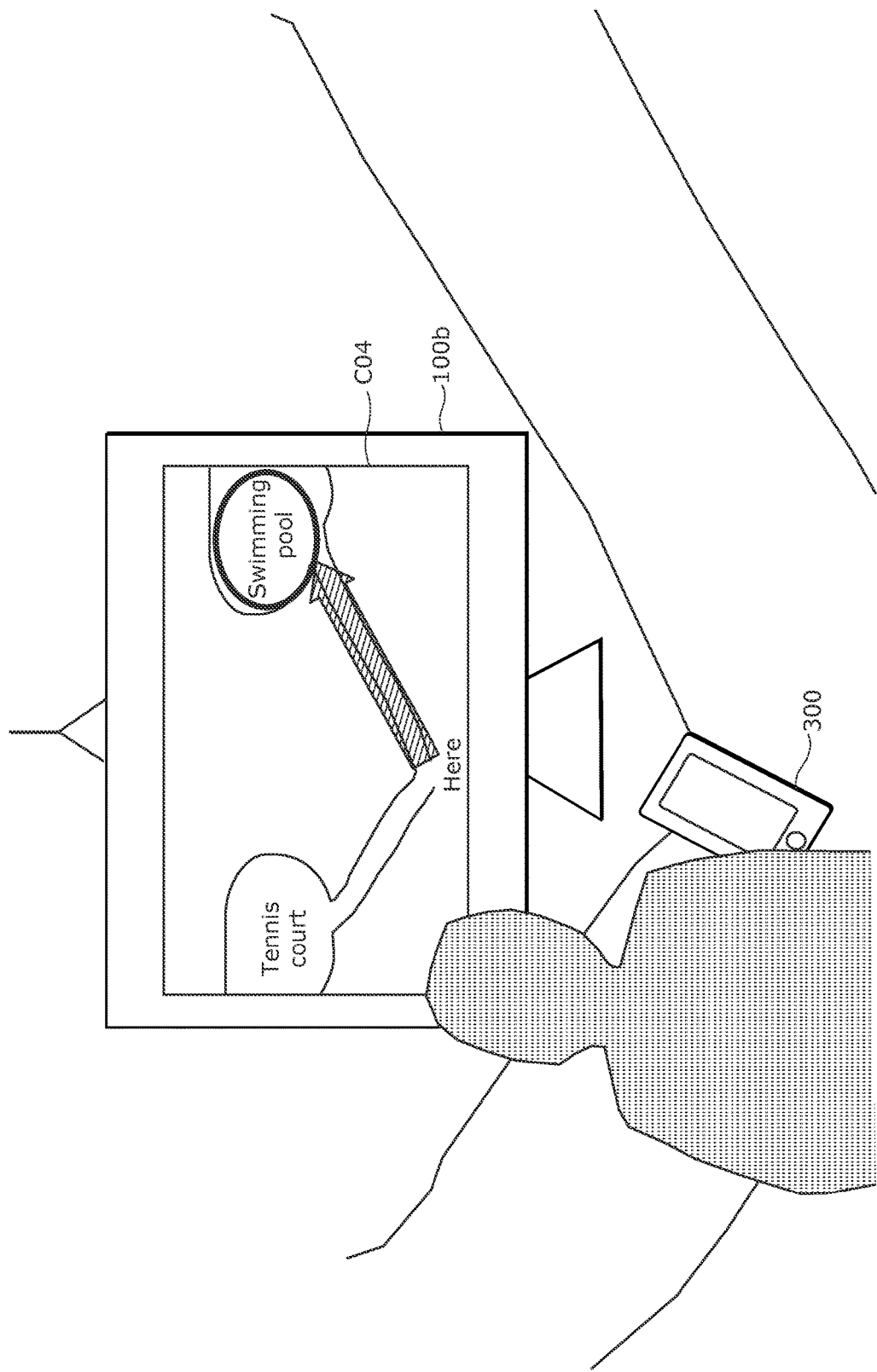
FIG. 17 is a diagram illustrating an example of displaying changed according to the portable terminal.

At Step S225, when the display device 100b transmits a beacon signal, the portable terminal 300, which further approaches the display device 100b and is currently at a distance of, for example, approximately 5 m from the display device 100b, receives the beacon signal and transmits signage data including intensity data indicating Medium to the server device 200 (Step S226). When receiving the signage data, the server device 200 determines that the user of the portable terminal 300 has already browsed some information regarding swimming as the ticket classification and the portable terminal 300 enters the inside of the wide area boundary, and therefore transmits display data designating a swimming content item 2 as display information to the display device 100b corresponding to swimming as the ticket classification (Step S17 in FIG. 11, Step S227 in FIG. 13). Here, the swimming content item 2 is the second content item in the display order of displaying content items regarding swimming. Here, the display device 100b displays, for example, a screen C04 including the swimming content item 2 (guidance information of the route to the swimming pool) as illustrated in FIG. 17. As a result, the user of the portable terminal 300 can check, for example, the route to the swimming pool, approaching the display device 100b.

At Step S228, when the display device 100b transmits a beacon signal, the portable terminal 300, which still further approaches the display device 100b and is currently at a distance of, for example, approximately 1 in from the display device 100b, receives the beacon signal and transmits signage data including intensity data indicating High to the server device 200 (Step S229).

At Step S230, when the display device 100b transmits a beacon signal, the portable terminal 300, which starts moving away from the display device 100b and is currently at a distance of, for example, approximately 5 m from the display device 100b, receives the beacon signal and transmits signage data including intensity data indicating Medium to the server device 200 (Step S231).

At Step S232, when the display device 100b transmits a beacon signal, the portable terminal 300, which moves further away from the display device 100b and is currently at a distance of, for example, approximately 13 m from the display device 100b, receives the beacon signal and transmits signage data including intensity data indicating Low to the server device 200 (Step S233). When receiving the signage data, the server device 200 determines that the portable terminal 300 moves to the outside of the wide area boundary, and therefore transmits display data designating a default content item as display information to the display device 100b (Step S23 in FIG. 11, Step S234 in FIG. 13). As a result, the display device 100b displays the screen C03 as illustrated in FIG. 16 again, At Step S235, when the display device 100b transmits a beacon signal, the portable terminal 300 is already far from the display device 100b and is currently at a distance of, for example, 16 m or more from the display device 100b, and therefore cannot receive the beacon signal and does not transmit signage data.

As described above, in the information display system 10, the plurality of display devices (signage) cooperate with one another to dynamically change display conditions or the like of each of the display devices based on how much the portable terminal gets close to one of the display devices (in other words, based on a history).

The user of the portable terminal 300 first gets close to the display device 100a to browse the swimming content item 1 to check the route to the swimming pool. When the user moving toward the swimming pool reaches a position near the display device 100b in a certain distance, the user can browse the swimming content item 2 while moving.

As a result, the swimming content item 2 for guiding the route to the swimming pool, for example, is displayed when the user merely gets near the display device 100b to be at a distance of, for example, approximately 5 m from the display device 100b without getting close to the display device 100b within a distance of 2 m from the display device 100b, Therefore, usability is high for the user moving towards the swimming pool.

[1-3-4. Display in the Case Where Information Regarding Ticket Classification is Not Available]

The above-described display devices 100a and 100b are capable of displaying display information regarding swimming as ticket classification. However, the display device 100d is not capable of displaying display information regarding swimming. The following describes displaying performed by such display device 100d.

The display device 100d is set on a route from the display device 100a to the tennis court, not to the swimming pool. Therefore, the display device 100d is not capable of displaying display information regarding swimming as ticket classification.

Figure 18:
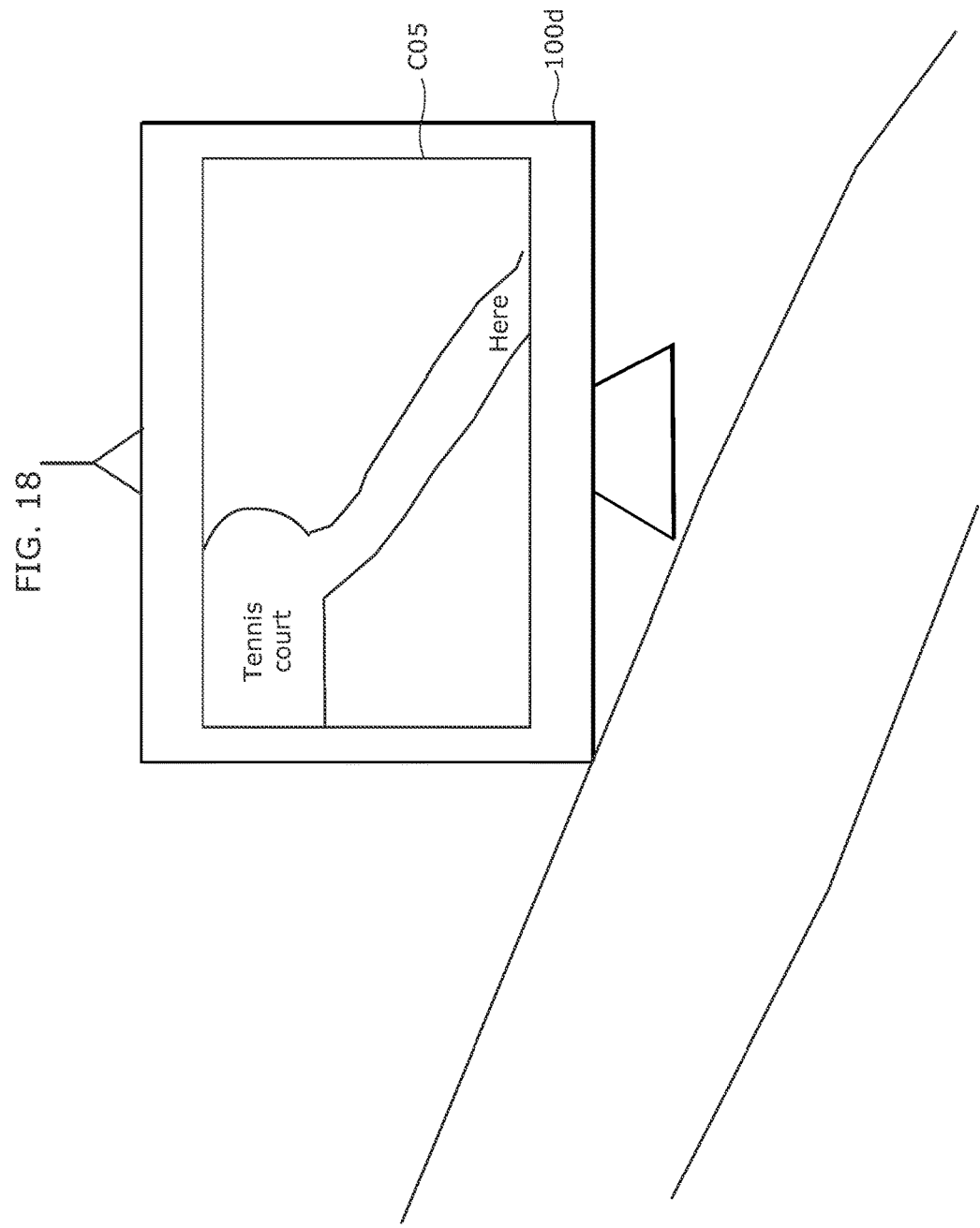
FIG. 18 is a diagram illustrating an example of displaying on the display device.
Figure 19:
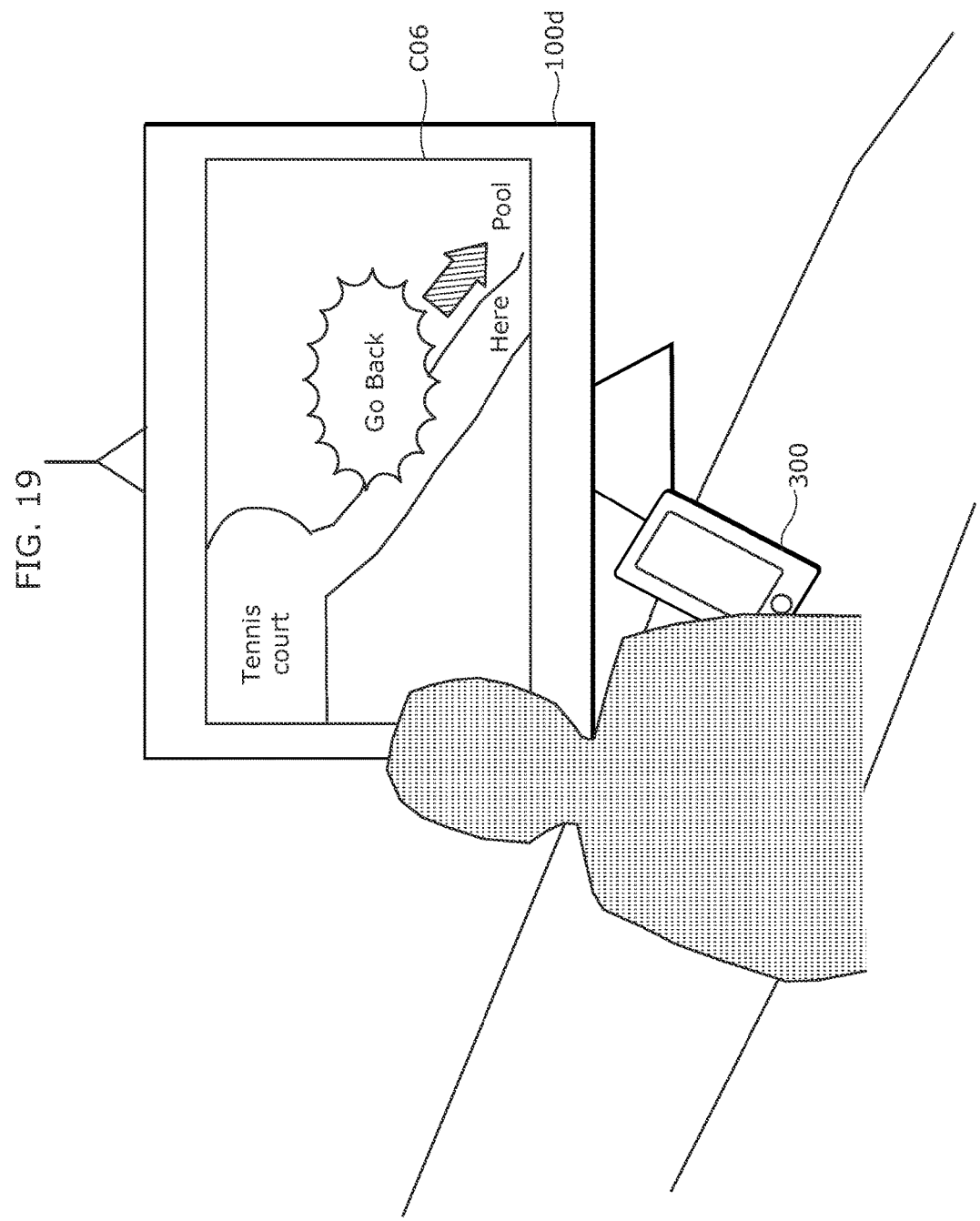
FIG. 19 is a diagram illustrating an example of displaying changed according to the portable terminal.

The display device 100d generally displays a screen C05 illustrated in FIG. 18. For example, if the user having a ticket for swimming has checked the route to the swimming pool on the display device 100a but has lost the route and comes near the display device 100d, the display device 100d displays a screen C06 including a warning content item as illustrated in FIG. 19, for example. The screen C06 warns the user that the user comes in the opposite direction of the swimming pool and should go back. The screen C06 is displayed as a result of Step S22 in FIG. 11. In other words, the screen C06 is displayed when the server device 200 receives signage data from the portable terminal 300 and thereby transmits display data designating a warning content item as display information to the display device 100d.

(Other Embodiments)

Thus, Embodiment 1 has been described as an example of the present disclosure. However, the present disclosure is not limited to Embodiment 1, and any appropriate modification, replacement, addition, omission, and the like on the embodiment are included in the present disclosure.

Figure 3:
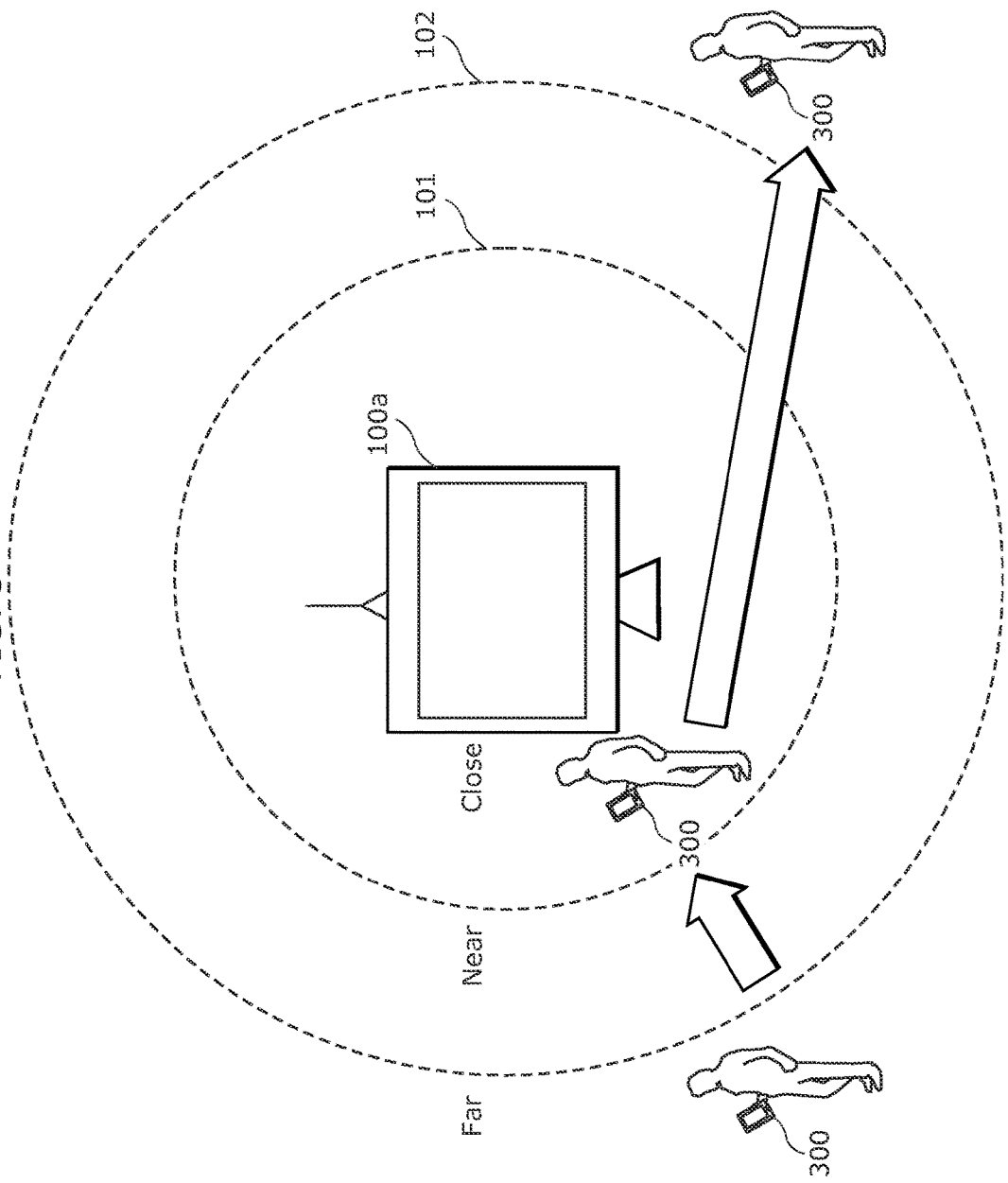
FIG. 3 is a diagram illustrating a positional relationship between a display device and the portable terminal.
Figure 20:
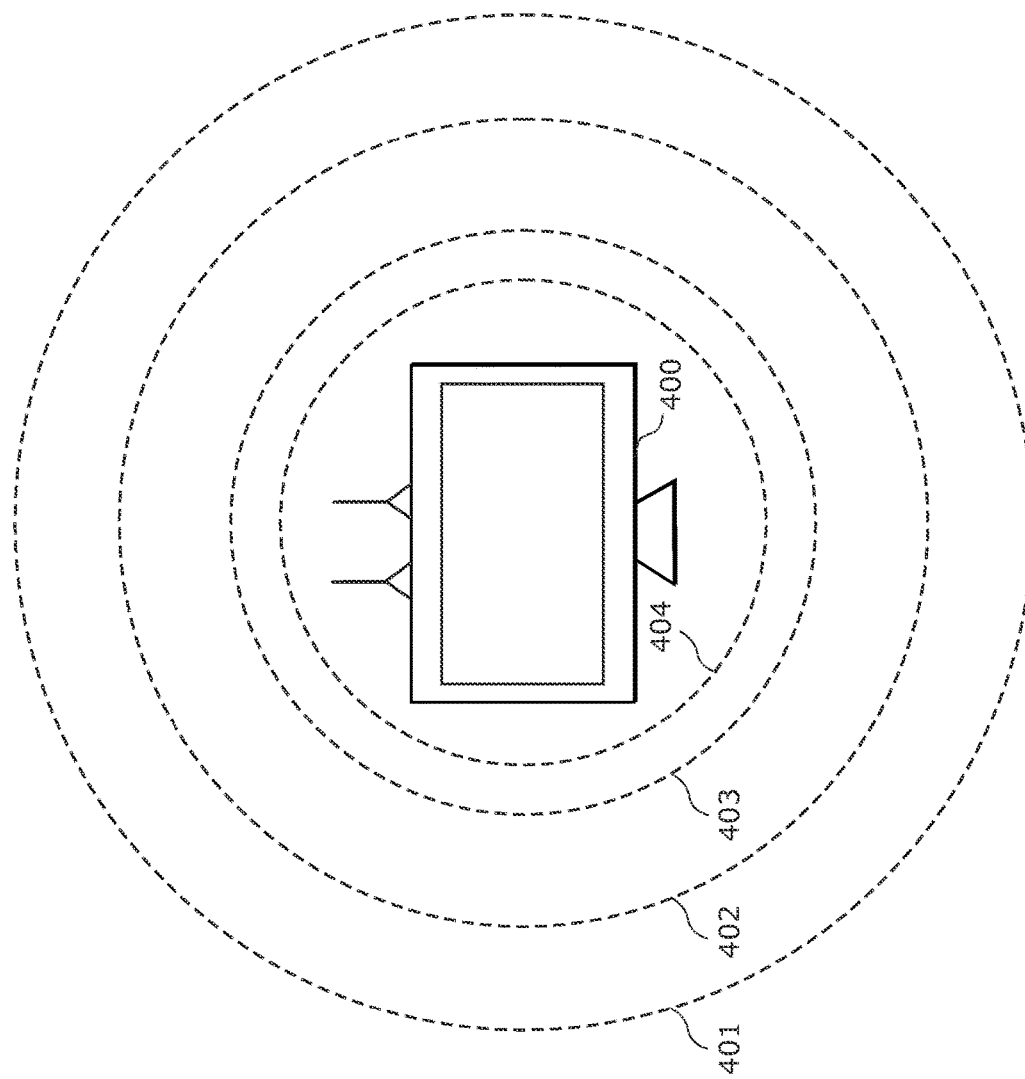
FIG. 20 is a schematic diagram illustrating an intensity of a beacon signal transmitted by the display device.

In Embodiment 1, each of the display devices 100a and the like includes a single beacon transmitter that transmits beacon signals (see FIG. 3). Therefore, the portable terminal 300 can estimate a distance from the display device 100a or the like by receiving a beacon signal and measuring an electric field intensity of the received beacon signal. When the distance is estimated based on the electric field intensity, the intensity is classified into levels of high, medium, and low, for example. However, in order to increase the resolution, it is also possible as illustrated in FIG. 20 that a display device 400 includes a plurality of beacon transmitters for transmitting beacon signals with respective different frequencies. The beacon signals transmitted by the beacon transmitters have respective different transmission outputs (power). For example, it is assumed that a boundary 404 is a boundary between an area with a high intensity and an area with a medium intensity for one beacon signal, and a boundary 402 is a boundary between the area with a medium intensity and an area with a low intensity of the beacon signal. It is also assumed that a boundary 403 is a boundary between an area with a high intensity and an area with a medium intensity of another beacon signal having a higher transmission output than that of the above beacon signal, and a boundary 401 is a boundary between the area with a medium intensity and an area with a low intensity of the other beacon signal. In the signage data transmitted by the portable terminal to the server device, a beacon ID of each of the beacon signals is associated with intensity data. Therefore, the server device can switch display information according to more detailed distance between the portable terminal and the display device 400.

Furthermore, it is possible that the beacon signal described in Embodiment 1 includes not only a beacon ID but also a threshold indicating a boundary of an electric field intensity to be measured as determination criteria, such as close to, near, or far from the display device. In this case, the portable terminal can include, into the signage data, data indicating how much the portable terminal approaches the display device based on the threshold, and transmit the resulting signage data to the server device.

It has been described in Embodiment 1 that when the portable terminal gets close to one of the display devices and receives a beacon signal from the display device under the certain condition, the server device 200 receives a beacon ID (part of signage data) from the portable terminal and records the received beacon ID to the user table as a browsing history. It is possible that the server device records beacon IDs and the like received from the portable terminal as described above, and accumulates and counts them to detect a flow of visitors in the sports event site and use the resulting flow data for display information on the display device. For example, it is possible to determine, as display information, guidance information for guiding visitors to avoid crowded places on a route to a target venue. It should be noted that the display information displayed on the display device is not limited to guidance information in a sports event site (for example, guidance information of routes to sports game venues). The display information may be event information, news, or any kind of information.

Furthermore, when the server device 200 determine display information to be displayed on each of the display devices, the display information may be dynamically changed based on a time of displaying the display information, signage data obtained from the portable terminal, and/or the like. For example, the display information may include the latest state, a game result, and the like of a sports game indicated by ticket classification.

Figure 21:
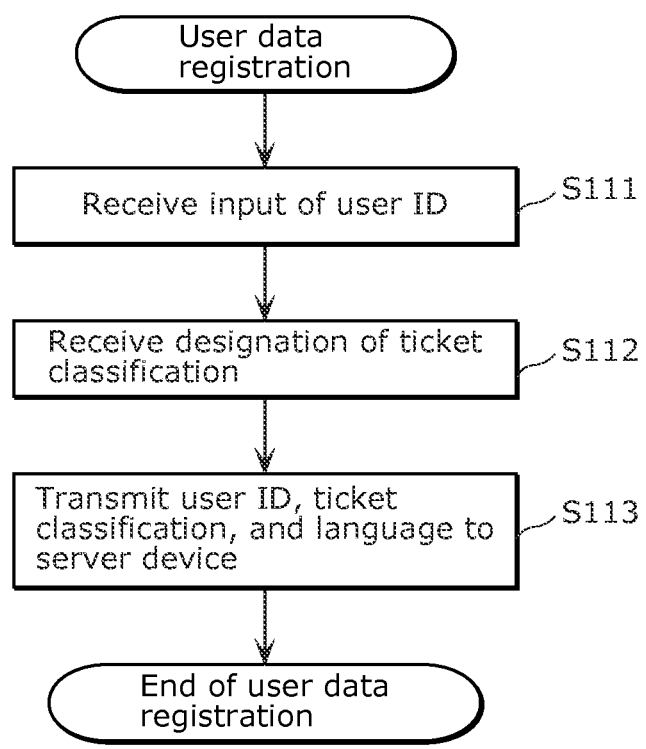
FIG. 21 is a flowchart of user data registration performed by the portable terminal.

It is also possible that the portable terminal 300 performs user data registration for notifying the server device 200 of a corresponding relationship between a user ID, ticket classification, and a language. FIG. 21 is a flowchart of the user data registration. The portable terminal 300 receives input of a user ID from the input unit 310 (Step S111), then receives designation of ticket classification (Step S112), and then causes the transmission unit 340 to transmit the user ID, the ticket classification, and also language data to the server device 200 (Step S113). It should be noted that the server device 200 holds the correspondence relationship between the user ID, the ticket classification, and the language in the user table, and refers to these pieces of data as needed. Although it has been described in Embodiment 1 that the portable terminal 300 adds ticket classification and language data into the signage data, it is also possible that the user data registration is performed once and the signage data does not include ticket classification and language data.

Although it has been described in Embodiment 1 that display information displayed on a display device is changed when the portable terminal 300 enters the inside of the boundary near the display device (for example, inside of the narrow area boundary) (see Step S17 in FIG. 11), it is also possible that the display information is changed when the portable terminal 300 has stayed inside the boundary for a predetermined time period or more (for example, for 20 seconds or more). The detection of the user's entry to the inside of the boundary may be performed based on an intensity that is measured once from a beacon signal received by the portable terminal 300, or based on temporal variation of intensities measured a plurality of times.

Although it has been detected in Embodiment 1 that the signage data includes a user ID, it is also possible that the portable terminal 300 has a terminal ID uniquely identifying the portable terminal 300 instead of the user ID, and the terminal ID is used in the same manner as the user ID. Furthermore, instead of a user ID, it is possible to use a telephone number corresponding to the portable terminal 300, an identification information determined by an application program operated in the portable terminal 300, or the like.

Although it has been described in Embodiment 1 that the display device displays display information on a display, it is also possible that the display device has a projector instead of the display and project images of display information on a wall or a screen.

Although it has been described in Embodiment 1 that the beacon transmitter transmits a beacon signal through radio waves, it is also possible that a beacon signal is transmitted by light (infrared rays or the like) by a light-emitting diode or the like, for example. In this case, the portable terminal may measure an intensity of a beacon signal that is light transmitted from a photodiode or the like, In other words, a beacon signal may be anything transmitted as electromagnetic waves. However, the transmission of a beacon signal via radio waves has advantages that a user's portable terminal as a receiver can easily receive the beacon signal even if the user does not expose the portable terminal to the outside, for example, the user carries the portable terminal inside a pocket of clothes or the like.

Furthermore, the order of the steps (for example, the steps in FIG. 10 and the steps in FIG. 11) in the information display method performed by the information display system 10 according to Embodiment 1 is not necessarily limited to the order described in Embodiment 1. It is possible to change the order or eliminate a part of the steps within the scope of the present disclosure.

Furthermore, it has been described in Embodiment 1 that the display unit 130 in each of the display devices switches content items as display information based on display data provided from the server device 200, in other words, based on intensity data, predetermined pieces of data, and the like which are provided from the portable terminal 300. In addition to the display information switching, it is also possible to control, based on intensity data or the like, whether or not to display the display information. For example, the display device may display nothing instead of a default content item.

Figure 22:
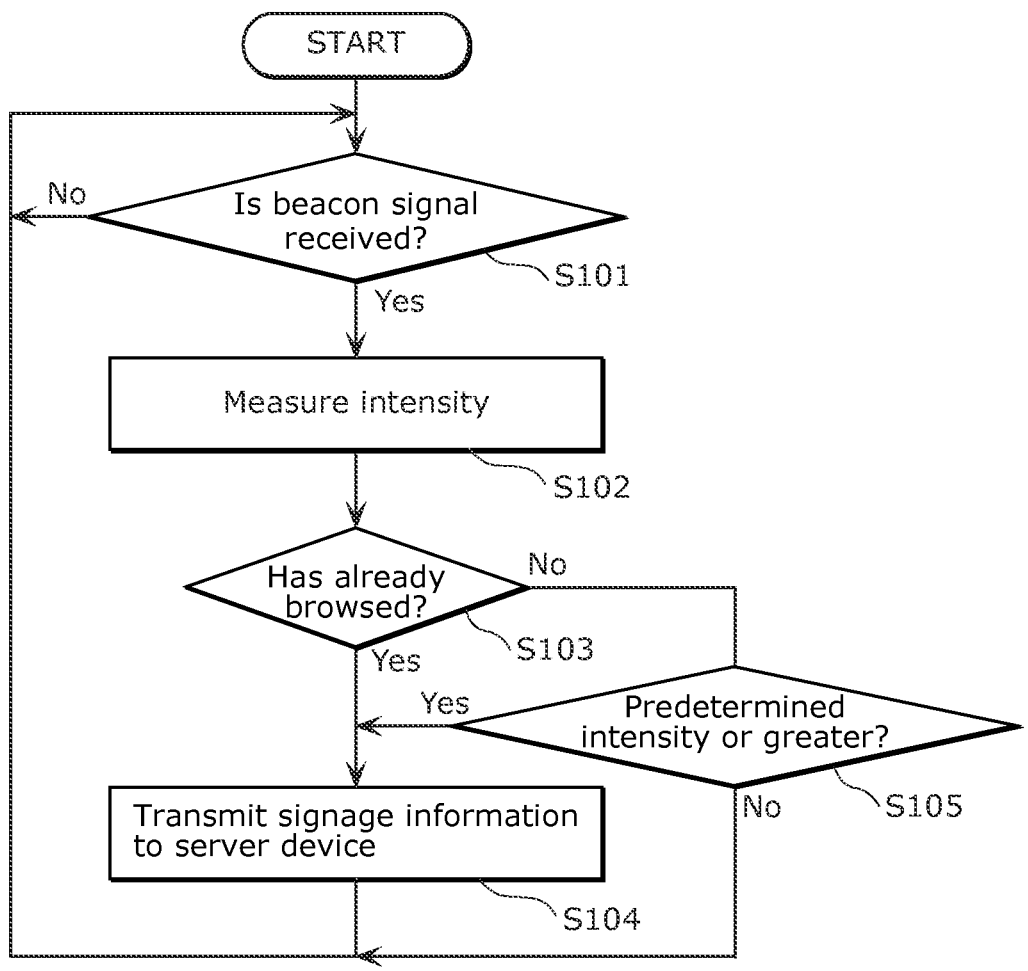
FIG. 22 is a flowchart of control performed by the portable terminal.

Although it has been described in Embodiment 1 that it is determined for each of the display devices whether or not to be capable of displaying information regarding each ticket classification. However, it is also possible that all the display devices are capable of displaying information regarding any ticket classification, Moreover, it has been described in Embodiment 1 that the portable terminal 300 transmits signage data including intensity data and the like to the server device 200 every time the portable terminal 300 receives the beacon signal. However, it is also possible to perform the transmission of signage data to the server device 200 only when an electric field intensity of the beacon signal received by the portable terminal 300 is a predetermined intensity or greater, FIG. 22 is a flowchart of the operations performed by the portable terminal 300 in this case. The portable terminal 300 receives a beacon signal (Step S101), then measures an electric field intensity (Step S102), and then determines whether or not the user has already browsed any information regarding target ticket classification (Step S103). At Step S103, if a predetermined condition is satisfied, in other words, for example, if the portable terminal 300 has already transmitted signage data including intensity data indicating that an electric field intensity of a received beacon signal is high, the portable terminal 300 determines that the user has already browsed some information regarding the target ticket classification. Alternatively, if the predetermined condition is satisfied, the beacon ID of the beacon signal is stored, and compared with a stored beacon ID. If the received beacon ID is identical to the stored beacon ID, it is determined that the user has already browsed some information regarding the target ticket classification. Then, if it is determined that the user has not yet browsed any information regarding the target ticket classification and the received beacon signal has an electric field intensity greater than or equal to a predetermined intensity (Step S105), the portable terminal 300 transmits signage data to the server device 200 (Step S104). On the other hand, if the user has already browsed some information regarding the target ticket classification, the portable terminal 300 transmits signage data to the server device 200 simply because a beacon signal is received (Step S104). As a result, the server device 200 can eliminate Steps S12 to S14 (in FIG. 11) when the server device 200 receives signage data.

A control program causing the portable terminal 300 to perform control processing in an information display system that includes the portable terminal and one or more display devices, the portable terminal having a recording medium and a processor, and the one or more display devices each repeatedly transmitting a signal including display-device identification data via electromagnetic waves and each performing displaying according to predetermined data transmitted from the portable terminal, the control program execute: repeatedly transmitting the signal from each of the one or more display devices via electromagnetic waves; receiving by the portable terminal the signal transmitted from a target display device among the one or more display devices, and measuring by the portable terminal an intensity of the signal; transmitting predetermined data and intensity data that indicates a result of the measuring; and changing a display state of the target display device according to the predetermined data and the intensity data which are transmitted in the transmitting, wherein the changing includes: changing the display state to a first state where display information is displayed according to the predetermined data, when the intensity indicated by the intensity data is greater than a first threshold; and changing a value of the first threshold after the changing of the display state to the first state.

Moreover, all or part of the above-described various processing (processing of FIGS. 10, 11, 21, and 22, for example) performed by the display devices, the portable terminal, and the server device may be executed by hardware in them or by software application. The processing by executing a software application is achieved when the processor included in each of the display devices, the portable terminal, and the server device executes a control program stored in a memory. The control program may be recorded onto a recording medium and thereby distributed. For example, such a distributed control program is installed into the devices and therefore executed in devices, so that the devices can perform the various processing (the processing of FIGS. 10, 11, 21, and 22, for example).

Furthermore, although it has been described in Embodiment 1 that there are a plurality of display devices in the information display system 10, it is also possible that the information display system 10 includes a single display device, a single server device, and a single portable terminal. It is further possible that the display device and the server device are integrated together, and data is exchanged directly between them without using the Internet. In this case, the display unit of the display device includes the function of the server device, and changes a display state according to intensity data and predetermined pieces of data which are transmitted from the portable terminal 300. As described above, the display device including the function of the server device may serve as the server device 200 for display devices (for example, the display device 100a and the like) which do not include the function of the server device.

It is further possible that the functional units in each of the display devices, the portable terminal, and the server device in Embodiment 1 may be set in separate devices. The functional units in the separate devices cooperate by communicating with one another via wires or wirelessly to perform the same information display method as that performed by the display device or the server device according to Embodiment 1.

Regarding the ticket classification illustrated in FIG. 2 and the like and described in Embodiment 1, it is also possible that if the user owns a plurality of tickets, the user can select a plurality of ticket classifications. In this case, for example, the portable terminal adds selected ticket classifications into signage data and transmits the resulting signage data to the server device 200. Then, the server device 200 may determine pieces of display information regarding the respective ticket classifications (for example, pieces of guidance information each indicating a route to a venue of a corresponding ticket), and transmits display data for instructing to display the pieces of display information in rotation to the display device. It is further possible that it is determined not to display the pieces of guidance information of the routes one by one, but to display pieces of guidance information at once on the same map.

It is still further possible that the receiving unit 120 described in Embodiment 1 does not necessarily wait display data from the transmission unit 250. For example, the receiving unit 120 may regularly access the server device 200 to check whether or not a new content item is added in the server device 200, and if there is a new content item, the receiving unit 120 transmits a request for the new content item to the server device 200 and thereby receives the new content item from the server device 200. Although it has been described in Embodiment 1 that the signage data (see FIG. 6) transmitted by the portable terminal includes intensity data, it is also possible that the signage data includes, instead of the intensity data, distance data indicating a distance from a target beacon transmitter which is estimated based on intensity. In this case, the server device 200 determines, based on the distance information instead of the intensity data, for example, whether or not the portable terminal enters or moves out from the inside of the boundary (Step S15 and S24 in FIG. 11, for example).

Although the user table (see FIG. 9) described in Embodiment 1 indicates only one ticket classification and only one browsing history, the user table may indicate a plurality of ticket classifications and a plurality of browsing histories.

It is also possible that the operations (see FIG. 10) performed by the portable terminal to transmit signage data to the server device 200 which has been described in Embodiment 1 may be performed not every time a beacon signal is received, but at regular time intervals to reduce the number of the transmission operations. It is further possible that the value itself, which is obtained by measuring intensity of a beacon signal, is included in signage data as intensity data.

It has been described in Embodiment 1 that the determination at Step S24 (see FIG. 11) is made based on whether or not the portable terminal moves to the outside of the wide area boundary. However, it is also possible to make the determination at Step S24 based on, for example, whether or not the user has already browsed some information regarding target ticket classification in the same manner as Steps S12 to S14, not based on the wide area boundary as a predetermined boundary.

Figure 23:
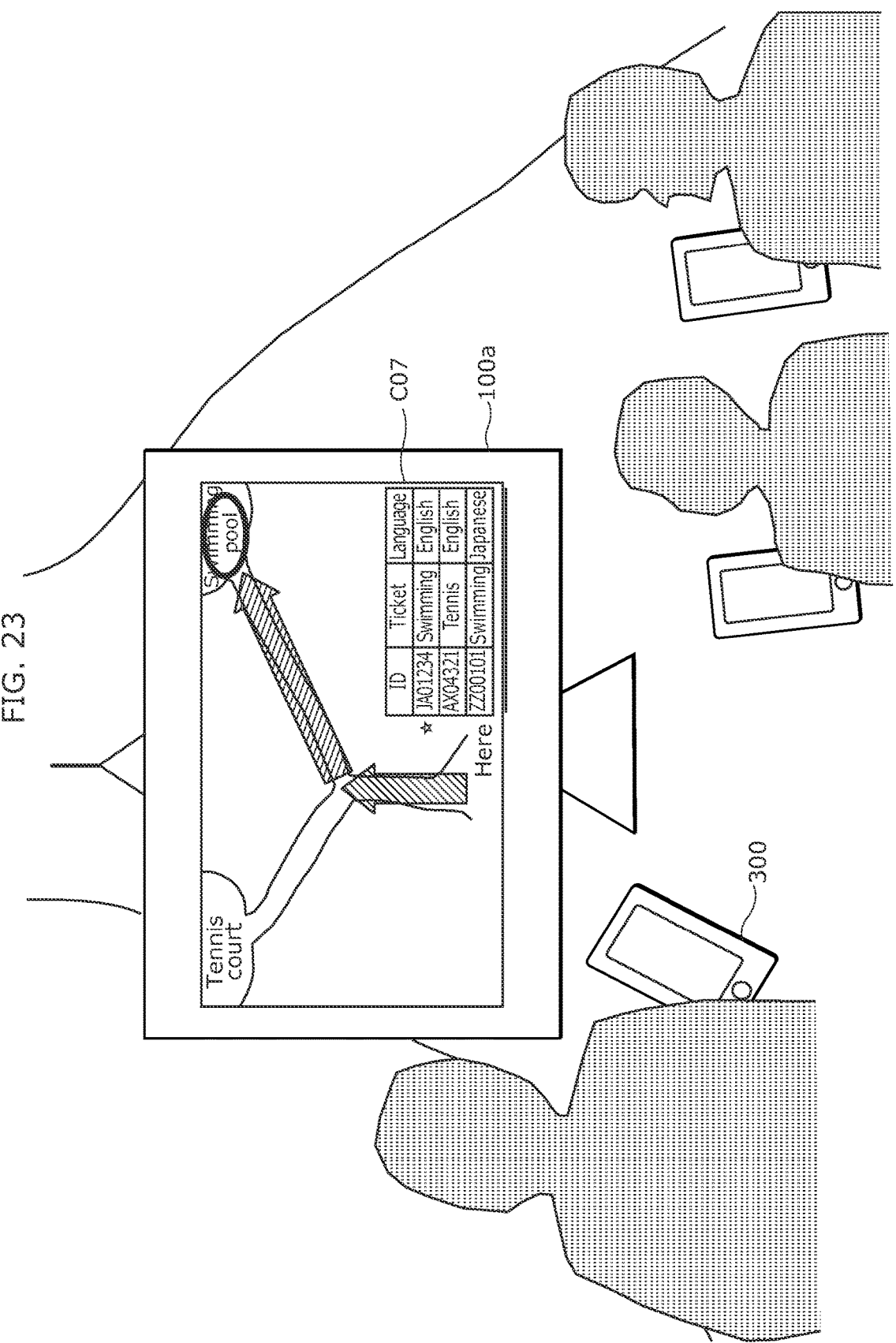
FIG. 23 is a diagram illustrating an example of displaying on the display device.

Furthermore, if a plurality of portable terminals sequentially enter an immediate vicinity of one display device (in other words, at a distance dose to one display device), the display device may prioritize the last entering portable terminal among them and a user of the last portable terminal to display information for the last user, On the other hand, it is also possible that the display device prioritizes the first entering portable terminal among them and a user of the first portable terminal to display information for the first user, and display a notice (the number of waiting users, for example) indicating that users entering after the first user are currently in a waiting list. FIG. 23 illustrates an example of a display screen in this case. On a screen C07, a star sign indicates for which user current information is provided, and a list indicates a user ID, ticket classification, a language, and the like of each of users who enter the immediate vicinity of the display device. In this case, if a user who has browsed the display information moves away from the display device, the display device displays information for a next user in the waiting list. It is also possible that the portable terminal of each of the users in the area displays a state or the like of the waiting list for the user.

If a plurality of portable terminals (in other words, users) enter an immediate vicinity of one display device within a predetermined unit time period (for example, within a minute), the display device may display the same information for the plurality of portable terminals (users) requiring the same information. Alternatively, it is also possible to sequentially display pieces of information in the descending order of portable terminals (users) which require the same information. An example of the same information is information indicating a route to the same place in the same language. For example, it is assumed that the first user A who first enters the immediate vicinity of a display device requires information of a route to the swimming pool in English, the second user B who enters the area following the first user A requires information of a route to the tennis court in English, and the third user C who enters the area following the second user B requires the same information as the information the first user A requires. In this case, the display device first displays the information of the route to the swimming pool in English for the two users (users A and C)

who require the same information, and then displays the information of the route to the tennis court in English for one user (user B).

Figure 24:
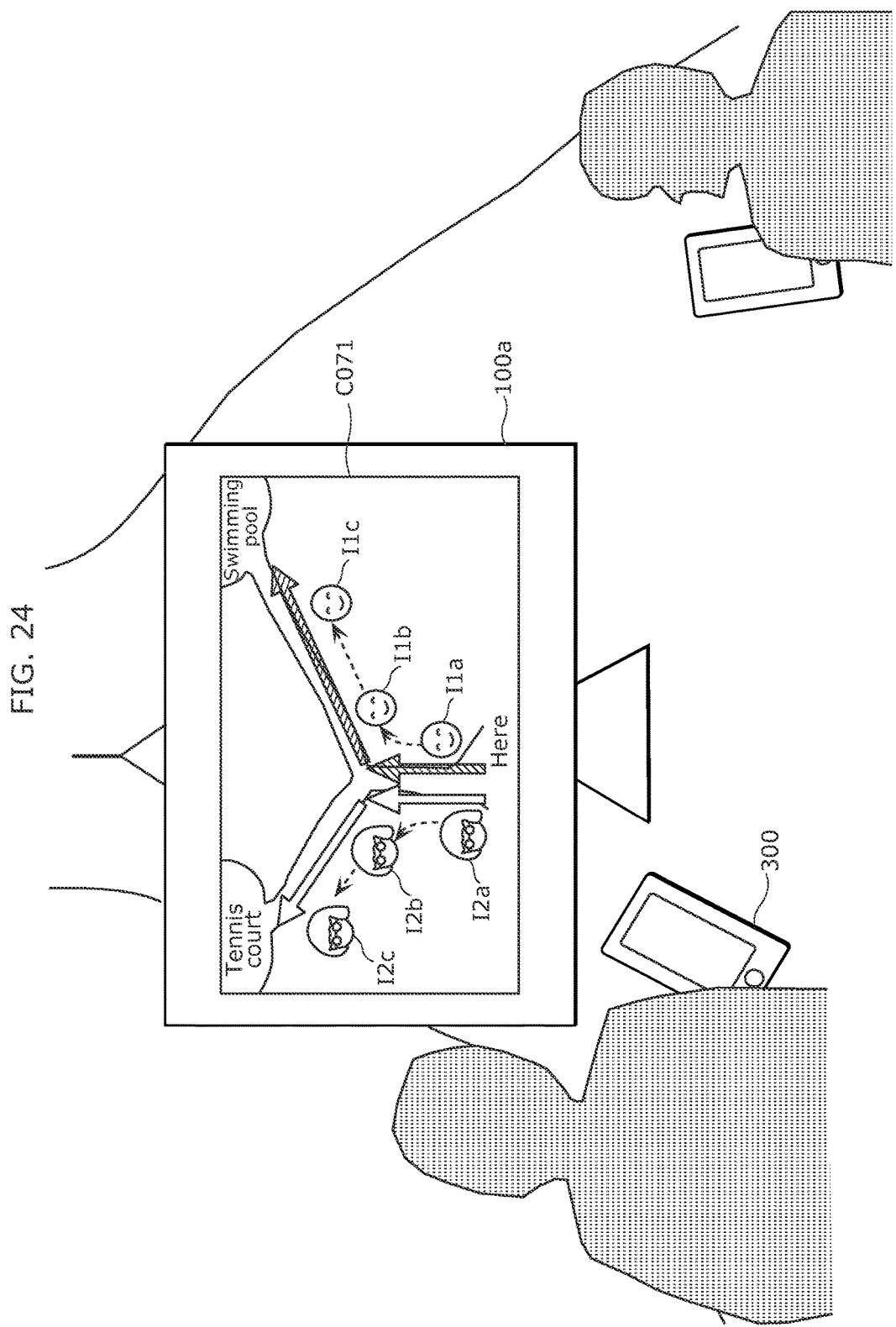
FIG. 24 is a diagram illustrating an example of displaying on the display device.

If a plurality of portable terminals sequentially enter an immediate vicinity of one display device, the display device may display pieces of information related to the respective portable terminals and their users sequentially in an order (for example, in an order of entry of the portable terminals into the area). In this case, the display device may display the pieces of information for the respective portable terminals (in other words, the pieces of information related to the respective portable terminals and their users) one by one, or at the same time by overlapping them each other. It is also possible that the pieces of information for the respective portable terminals and their users displayed at the same time with respective icons each uniquely indicating a corresponding portable terminal or user. FIG. 24 illustrates an example of a display screen in this case. On a screen C071, with information for the first user (user A) getting close to the display device 100a (information indicating the route to the swimming pool), an icon I1a, an icon I1b, and an icon I1c for the user A are switched to be sequentially displayed (in other words, the position of the icon is sequentially changed). The user perceives the switching display as an animation in which the icon moves along the route for the user on a map. Furthermore, on the screen 0071, with information for the second user (user B) getting close to the display device 100a (information indicating the route to the tennis court), an icon I2a, an icon I2b, and an icon I2c for the second user B are switched to be sequentially displayed. These icons are used to distinguish information for a target user from information for other users on the same screen. It is possible that each of users has stored icon data in a user's portable terminal, for example, by inputting the icon data into the portable terminal, to be used to identify information for the user, and that the portable terminal adds the icon data to the signage data 510 (see FIG. 6). Alternatively, the icon data for the user may be stored in the user table 540 (see FIG. 9). Therefore, the server device or the display device can add icons as illustrated in FIG. 24 to the display information, based on the signage data 510 or the user table 540 which includes the icon data. The icons do not necessarily move on the screen. If the same information is provided to a plurality of portable terminals (users) who require the information, the information may be displayed with a plurality of icons corresponding to the respective users. If the second user B gets close to the display device 100a while the display device 100a is displaying information for the first user A who has first approached the display device 100a, it is possible to display also information for the user B to overlap the information for the user A. Therefore, a time of displaying information is different for each user. For example, first, a route and the icon I1a for the user A are displayed. After the icon I1a is switched to the icon I1b, a route and the icon I1a for the user B are displayed. Then, as time passes, the icon I1c and the icon I2b are displayed.

Furthermore, a beacon transmitter may be separate from a display device. In this case, the server device 200 may manage a correspondence between a device ID for identifying the display device and a beacon ID.

Moreover, the data of display order as indicated in the signage table (see FIG. 7) may include data for identifying the last information regarding ticket classification in the display order.

Figure 25:
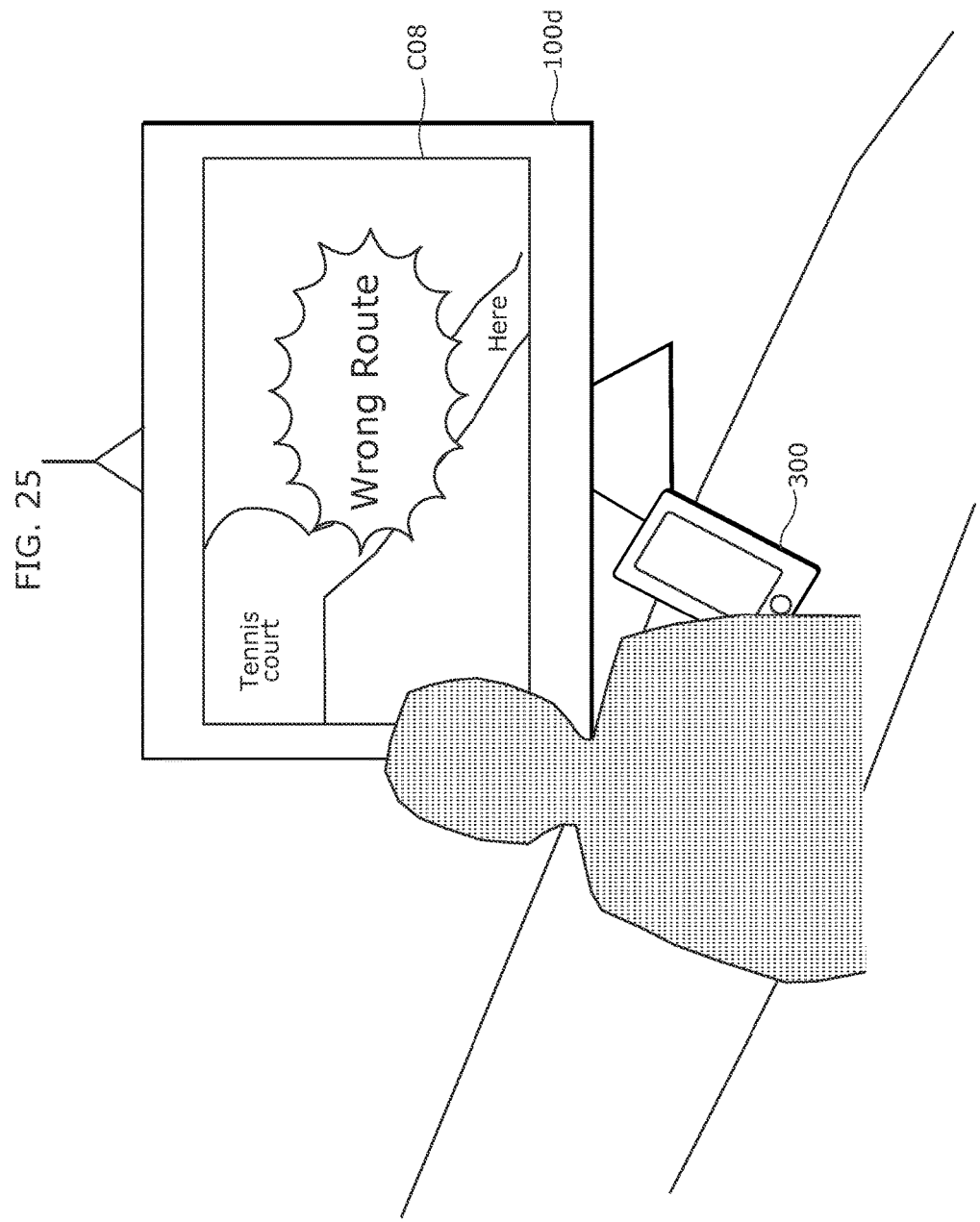
FIG. 25 is a diagram illustrating an example of displaying on the display device.

The warning content item (see FIG. 19) described in Embodiment 1 may be a general content item to be displayed regardless of ticket classification. FIG. 25 illustrates an example of such a general content item on a screen C08. It is also possible to record an order of browsing content items (in other words, an order of having displayed content items) as browsing histories (see FIG. 9). In this case, if a guidance information content item (for example, guidance information of a route to a target venue) to be currently displayed on a display device for the user in a display order is prior to already browsed content item(s) in the above browsing order (in other words, if the user goes backwards on the route), a warning content item may be displayed. It is also possible to alternately display the warning content item and the route guidance content item, or displaying the warning content item to overlap the guidance content item.

Figure 26:
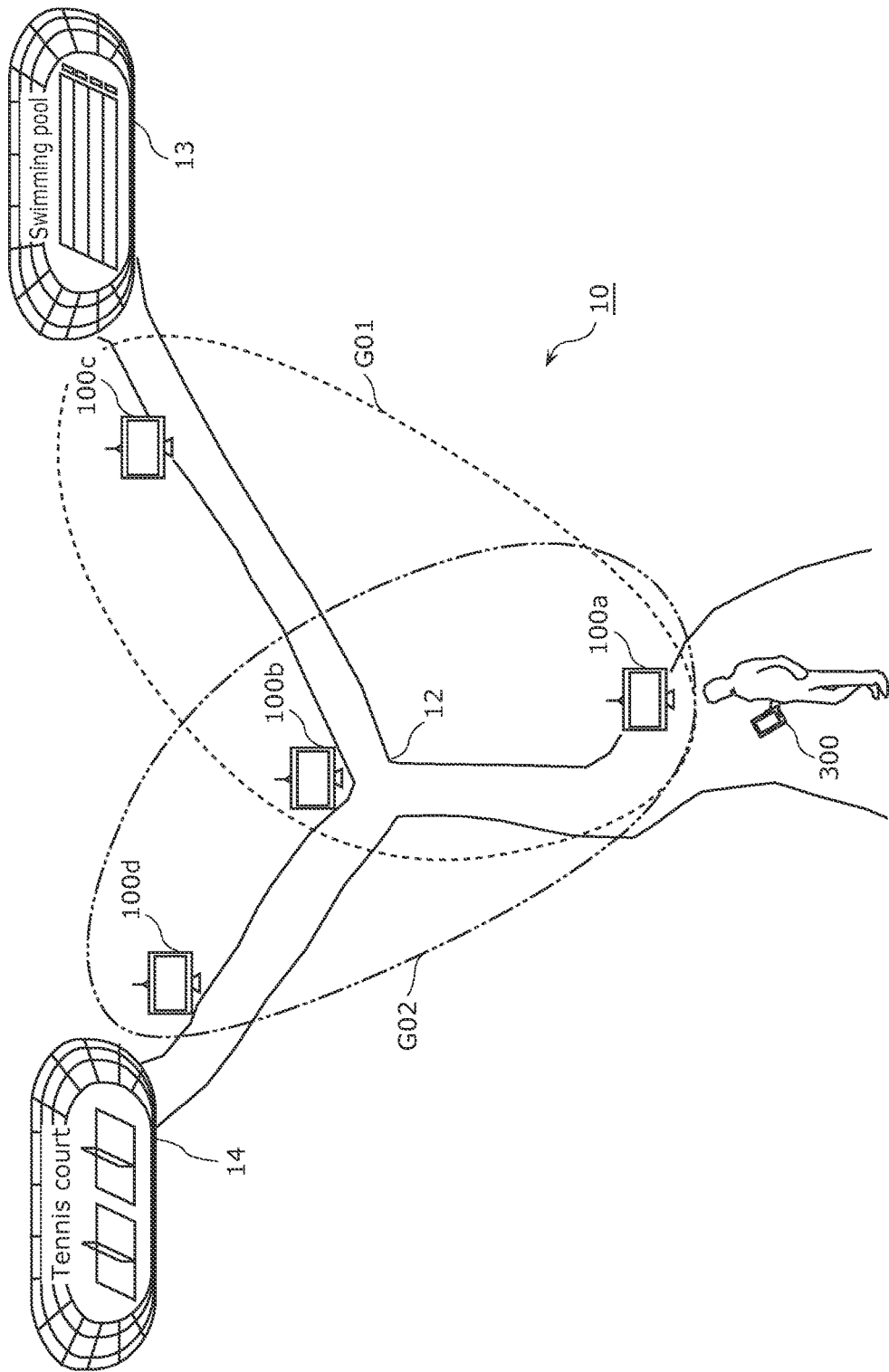
FIG. 26 is a schematic diagram illustrating a relationship between a specific area (initial state) of each ticket classification and display devices.

If the user has got close to one of the display devices and already browsed some information on the display device, the server device 200 described in Embodiment 1 can limit display devices capable of displaying information to the user to only display devices in a specific area, so that the limited display devices can display information for the user when the user is within a certain distance from the next display device which is longer than the distance from the previous display device in the previous browsing, without getting close to the next display device. In other words, the server device 200 may set the display devices included in the specific area to serve as the display devices for which the wide area boundary is set. The specific area may be determined for each ticket classification according to ticket classification based on which a content item to be displayed on a display device is determined. FIG. 26 is a schematic diagram illustrating a relationship between a specific area for each ticket classification and display devices. As long as the specific area can specify a part of the display devices, the specific area may be an area including positions of one or more display devices (for example, an area on the ground which is determined by longitude, latitude, and the like), or an area for individually specifying one or more display devices (for example, an area specifying display devices A, B, and C among display devices A, B, C, D, and E). Display devices specified by a specific area can be expressed as display devices existing in the specific area. The server device 200 sets, as an initial state (initial value) of a specific area, a value for including, in other words, identifying, all display devices capable of displaying display information for each ticket classification. A specific area G01 in FIG. 26 is a specific area in an initial state corresponding to swimming as ticket classification. In the specific area G01, there are the display device 100a, the display device 100b, and the display device 100c. A specific area G02 in FIG. 26 is a specific area in an initial state corresponding to tennis as ticket classification. In the specific area G02, there are the display device 100a, the display device 100b, and the display device 100d. In this case, after a user having a ticket of tennis as ticket classification gets close to the display device 100a and browses display information on the display device 100a, the display device 100b displays display information for the user when the user merely gets near the display device 100b to be at a certain distance from the display device 100b which is longer than the distance from the display device 100a in the previous browsing, without getting close to the display device 100b. This means that, if the user carrying the portable terminal 300 has approached the display device 100a and the display state of the display device has thereby been changed, a value of the threshold of the intensity data to be used in the determination as to whether or not the portable terminal 300 is inside the boundary is changed for each of the display devices 100b and 100c which belong to the specific area G01. The threshold of the intensity data for the display devices belonging to the specific area G01 is a predetermined great value before the user browses information displayed on the display device 100a. After the user browses the information, the threshold is changed to a predetermined small value.

However, even after the user gets close to the display device 100a and browses display information on the display device 100a, the display state of the display device 100d that is outside of the specific area G01 for swimming as ticket classification is not changed merely by user's approaching the display device 100d, This means that the threshold of the intensity data to be used in the determination as to whether or not the portable terminal is inside the boundary is not changed for the display device 100d that does not belong to the specific area G01.

Figure 27:
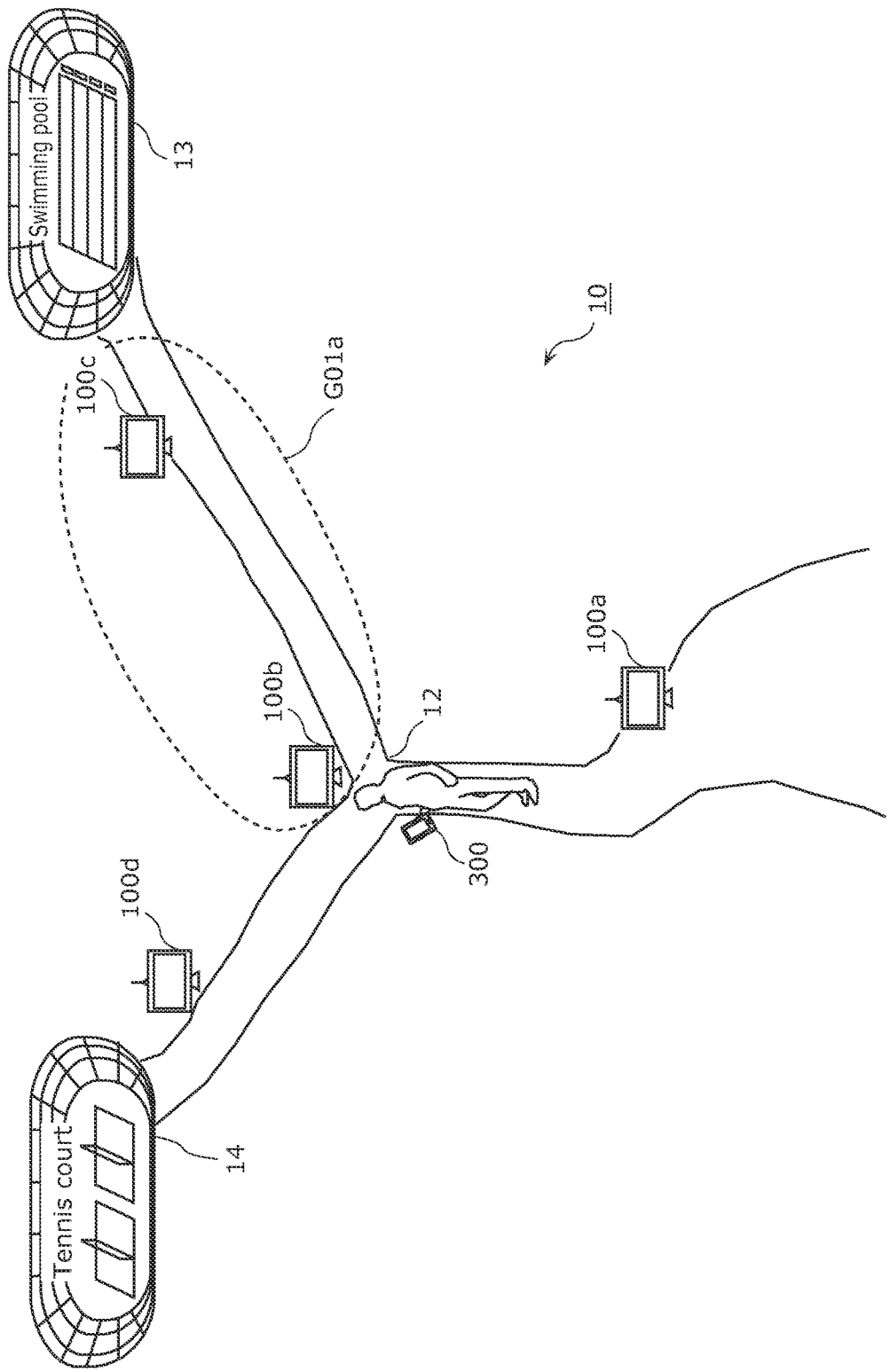
FIG. 27 is a schematic diagram illustrating a relationship between a changed specific area and display devices.

Furthermore, the server device 200 may dynamically change such a specific area according to user's move. More specifically, the server device 200 may have a function of changing a specific area based on a display device on which the user has last browsed display information (display device identified by a beacon ID included in signage data) and ticket classification included in the signage data. FIG. 27 is a schematic diagram illustrating a relationship between a changed specific area and display devices. A specific area G01a in FIG. 27 is a specific area changed by the server device 200 after the user having a ticket of swimming as ticket classification browses display information on the display device 100b, in the server device 200, it is predetermined how to change the specific area after the user browses display information on which display device. For example, in the case where a user having a ticket of swimming as ticket classification moves to the swimming pool and sequentially browses display information on the display devices, the server device 200 reduces a size of an area to exclude display devices which the user has already passed from the specific area. For example, if the second content item regarding swimming in the display order is browsed, a display device for displaying the first content item in the display order is excluded from the specific area. The number of display devices included in the specific area is determined to be reduced, for example, as the user is getting near to a destination corresponding to the ticket classification (the swimming pool in the case of a swimming ticket). The above control on a specific area can prevent that a display state of a display device outside the specific area G01a is changed when the user merely gets near the display device without getting close to the display device when the user changes his/her way from the route to the swimming pool to the route to a venue of different sports. The server device 200 may reset the specific area to the initial state, when the user arrives at the destination, in other words, when the user browses the last content item regarding the ticket classification of the user's ticket in the display order. Furthermore, the server device 200 may reset the specific area to the initial state, for example, when the user goes out from a predetermined area that is wide enough to include the destination, when a predetermined time period has passed from when the user has browsed the last information, or when the user changes selected ticket classification, for example. Furthermore, when the server device 200 described in Embodiment 1 has transmitted display data indicating a route guidance content item as display information to a display device but has not received signage data including a beacon ID related to the display device for a predetermined time period calculated from the time of the transmission, the server device 200 may transmit display data indicating a default content item as display information to the display device.

It should also be noted that each of the functional units (functional blocks) in each of the display devices, the portable terminal, the server device in the information display system 10 may be implemented into a single chip of a semiconductor device, such as an integrated circuit (IC) or a large scale integration (LSI), or a part or all of the functional units may be integrated into a single chip. The technique of integrated circuit is not limited to the LSI, and it may be implemented as a dedicated circuit or a general-purpose processor. It is also possible to use a field programmable gate array (FPGA) that can be programmed after manufacturing the LSI, or a reconfigurable processor in which connection and setting of circuit cells inside the LSI can be reconfigured. Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

INDUSTRIAL APPLICABILITY

The present disclosure is applicable to systems (digital signage) for displaying information to each individual browser in a specific place.

The invention claimed is:
1. A non-transitory computer-readable recording medium for use in a computer, the recording medium having a control program recorded thereon for causing a portable terminal to perform control processing in an information display system that includes the portable terminal and a plurality of display devices, the portable terminal having a recording medium and a processor, and the plurality of display devices each repeatedly transmitting a signal including display-device identification data via electromagnetic waves and each performing displaying according to predetermined data transmitted from the portable terminal, the control program executing:
receiving the signal transmitted from a target display device among the plurality of display devices;
measuring an intensity of the signal;
storing a value of the display-device identification data onto the recording medium under a certain condition;
determining whether the value of the display-device identification data stored in said storing is the same as a value of display-device identification data previously stored onto the recording medium; and
(i) transmitting the predetermined data when it is determined in said determining that the value of the display-device identification data stored in said storing is not the same as the value of display-device identification data previously stored onto the recording medium only if the intensity measured in the measuring is greater than or equal to a predetermined intensity, and (ii) transmitting the predetermined data when it is determined in said determining that the value of the display-device identification data stored in said storing is the same as the value of display-device identification data previously stored onto the recording medium, regardless of the intensity measured in the measuring.

* * * * *